United States Patent
Yin et al.

(10) Patent No.: US 9,118,474 B2
(45) Date of Patent: *Aug. 25, 2015

(54) UPLINK CONTROL INFORMATION TRANSMISSION ON BACKWARD COMPATIBLE PUCCH FORMATS WITH CARRIER AGGREGATION

(71) Applicant: Sharp Kabushiki Kaisha, Osaka-shi, Osaka (JP)

(72) Inventors: Zhanping Yin, Vancouver, WA (US); Shohei Yamada, Carmas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/509,291

(22) Filed: Oct. 8, 2014

(65) Prior Publication Data

US 2015/0023305 A1   Jan. 22, 2015

Related U.S. Application Data

(63) Continuation of application No. 12/901,396, filed on Oct. 8, 2010, now Pat. No. 8,885,496.

(51) Int. Cl.
| | | |
|---|---|---|
| H04L 12/56 | (2006.01) |
| H04L 1/16 | (2006.01) |
| H04L 1/00 | (2006.01) |
| H04L 1/18 | (2006.01) |
| H04L 1/20 | (2006.01) |
| H04L 5/00 | (2006.01) |
| H04L 25/03 | (2006.01) |
| H04W 24/10 | (2009.01) |
| H04W 28/06 | (2009.01) |

(52) U.S. Cl.
CPC .............. *H04L 1/1671* (2013.01); *H04L 1/003* (2013.01); *H04L 1/0031* (2013.01); *H04L 1/1861* (2013.01); *H04L 1/20* (2013.01); *H04L 5/00* (2013.01); *H04L 5/001* (2013.01); *H04L 5/0053* (2013.01); *H04L 5/0057* (2013.01); *H04L 2025/03808* (2013.01); *H04W 24/10* (2013.01); *H04W 28/06* (2013.01)

(58) Field of Classification Search
CPC ........ H04W 28/06; H04W 24/10; H04L 1/20; H04L 2025/03808; H04L 5/0001; H04L 5/00; H04L 5/0057; H04L 1/1671; H04L 1/0031; H04L 1/1861
USPC ................... 370/252, 277, 329, 389
See application file for complete search history.

(56) References Cited

PUBLICATIONS

Yin et al., "Uplink Control Information Tansmission on Backward Compatible PUCCH Formats with Carrier Aggregation", U.S. Appl. No. 12/901,396, filed Oct. 8, 2010.

*Primary Examiner* — Andrew Chriss
*Assistant Examiner* — Peter Mak
(74) *Attorney, Agent, or Firm* — Keating & Bennett, LLP

(57) ABSTRACT

A method for reporting uplink control information (UCI) on a user equipment (UE) is described. A number of bits for a channel quality indicator and/or a precoding matrix index and/or a rank indication (CQI/PMI/RI) is obtained. A number of component carriers with hybrid automatic repeat request acknowledgement (HARQ-ACK) reporting is also obtained. A total number of HARQ-ACK bits is further obtained. A number of HARQ-ACK bits that can be carried on the physical uplink control channel (PUCCH) is determined. Bundling is performed on the total number of HARQ-ACK bits to be reported to fit the total number of HARQ-ACK bits to be reported into the number of HARQ-ACK bits that can be carried on the PUCH. A backward compatible PUCCH format is used to simultaneously carry the CQI/PMI/RI bits and the HARQ-ACK bits.

4 Claims, 14 Drawing Sheets

UPLINK CONTROL INFORMATION TRANSMISSION ON BACKWARD COMPATIBLE PUCCH FORMATS WITH CARRIER AGGREGATION

TECHNICAL FIELD

The present invention relates generally to wireless communications and wireless communications-related technology. More specifically, the present invention relates to systems and methods for uplink control information transmission on backward compatible physical uplink control channel (PUCCH) formats with carrier aggregation.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of cells, each of which may be serviced by a base station. A base station may be a fixed station that communicates with mobile stations.

Various signal processing techniques may be used in wireless communication systems to improve efficiency and quality of wireless communication. One such technique may include using multiple antennas for multiple-input and multiple-output (MIMO) or transmit diversity (TxD). Additional gains may be realized within these channels. Benefits may be realized by providing gains within these control channels while maintaining or increasing reliability and sustaining compatibility with older equipment. Therefore, benefits may be realized by improved encoding and/or decoding techniques.

DETAILED DESCRIPTION

Figure 1:
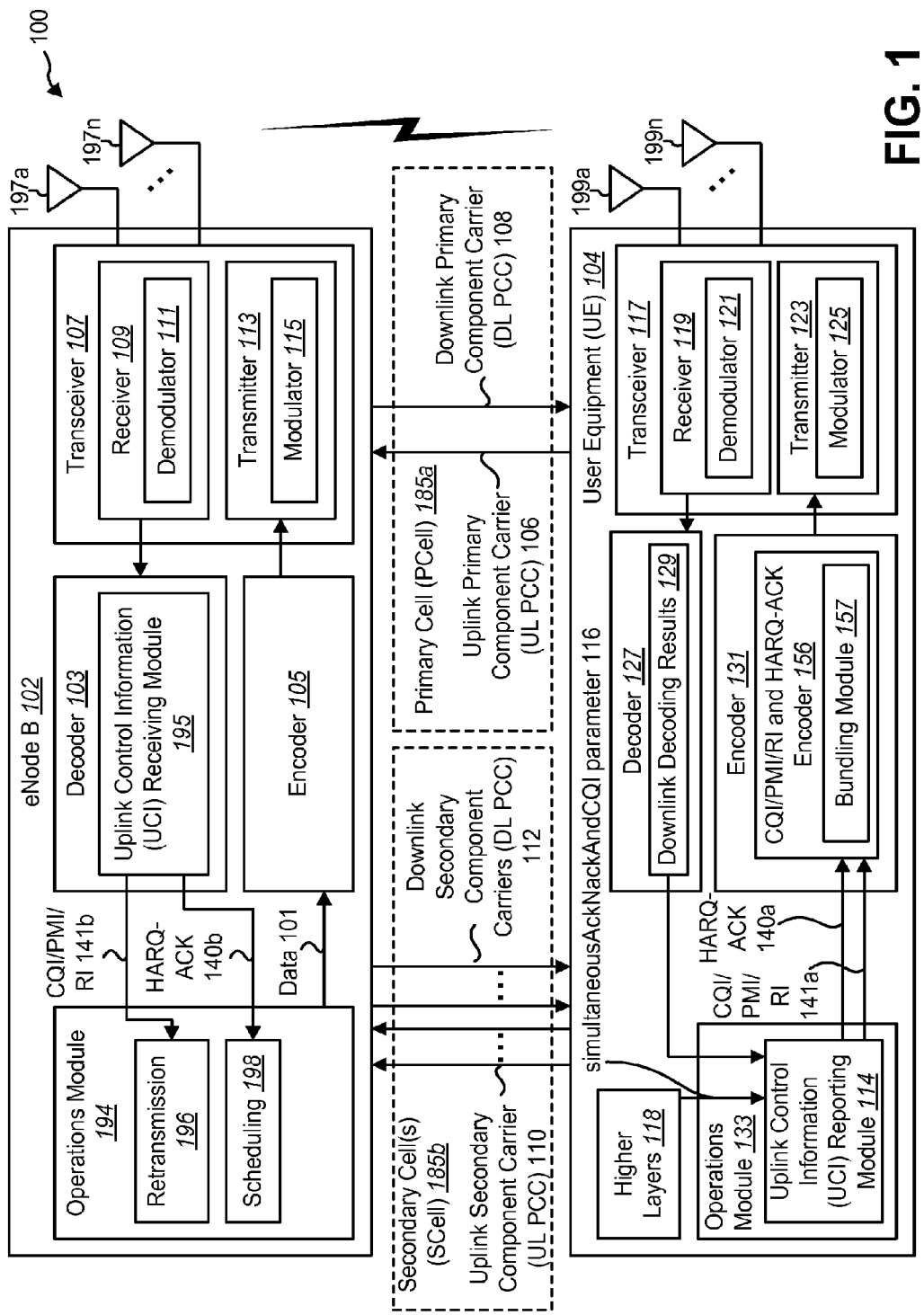
FIG. 1 is a block diagram illustrating a wireless communication system using uplink control information (UCI) multiplexing.

A method for reporting uplink control information (UCI) on a user equipment (UE) is described. A number of bits for a channel quality indicator and/or a precoding matrix index and/or a rank indication (CQI/PMI/RI) is obtained. A number of component carriers with hybrid automatic repeat request acknowledgement (HARQ-ACK) reporting is also obtained. A total number of HARQ-ACK bits to be reported is further obtained. A number of HARQ-ACK bits that can be carried on the physical uplink control channel (PUCCH) is also determined. Bundling is performed on the total number of HARQ-ACK bits to be reported to fit the total number of HARQ-ACK bits to be reported into the number of HARQ-ACK bits that can be carried on the PUCCH. A backward compatible PUCCH format is used to simultaneously carry the CQI/PMI/RI bits and the bundled HARQ-ACK bits.

Bundling may include at least one of full HARQ-ACK bundling, partial HARQ-ACK bundling, spatial bundling and cross-component carrier bundling. It may be determined that simultaneous CQI/PMI/RI and HARQ-ACK reporting on the PUCCH is supported. The backward compatible PUCCH format may work with Release-8, Release-9 and Release-10 UEs.

Using a backward compatible PUCCH format may include applying full HARQ-ACK bundling on the HARQ-ACK bits to obtain one bundled HARQ-ACK bit. Using a backward compatible PUCCH format may also include determining that the physical channel structure has normal cyclic prefix (CP). Using a backward compatible PUCCH format may further include sending the CQI/PMI/RI bits and the one bundled HARQ-ACK bit on the PUCCH using Format 2a. The bundled HARQ-ACK bit may be carried on the $2^{nd}$ reference symbol.

Using a backward compatible PUCCH format may include applying full HARQ-ACK bundling on the HARQ-ACK bits to obtain one bundled HARQ-ACK bit. Using a backward compatible PUCCH format may also include determining that the physical channel structure has extended cyclic prefix (CP). Using a backward compatible PUCCH format may further include concatenating the CQI/PMI/RI bits and the one bundled HARQ-ACK bit. Using a backward compatible PUCCH format may also include applying joint coding to the concatenated bits. Using a backward compatible PUCCH format may further include sending the joint coded concatenated bits on the PUCCH using Format 2.

Using a backward compatible PUCCH format may include applying partial HARQ-ACK bundling on the HARQ-ACK bits to obtain two bundled HARQ-ACK bits. Using a backward compatible PUCCH format may also include determining that the physical channel structure has normal cyclic prefix (CP). Using a backward compatible PUCCH format may further include sending the CQI/PMI/RI bits and the two bundled HARQ-ACK bits on the PUCCH using Format 2b. The two bundled HARQ-ACK bits may be carried on a $2^{nd}$ reference symbol.

Using a backward compatible PUCCH format may include applying partial HARQ-ACK bundling on the HARQ-ACK bits to obtain two bundled HARQ-ACK bits. Using a backward compatible PUCCH format may also include determining that the physical channel structure has extended cyclic prefix (CP). Using a backward compatible PUCCH format may further include concatenating the CQI/PMI/RI bits and the two bundled HARQ-ACK bits. Using a backward compatible PUCCH format may also include applying joint coding to the concatenated bits. Using a backward compatible PUCCH format may further include sending the joint coded concatenated bits on the PUCCH using Format 2.

The bundling may include partial HARQ-ACK bundling. Performing partial HARQ-ACK bundling may include dividing the total number of HARQ-ACK bits to be reported by the number of HARQ-ACK bits that can be carried on the PUCCH to obtain a number of bits per bundle. Performing partial HARQ-ACK bundling may also include bundling a next unbundled number of bits per bundle into a next bundled HARQ-ACK bit.

Performing partial HARQ-ACK bundling may include determining a number of component carriers. Performing partial HARQ-ACK bundling may also include performing spatial bundling on each component carrier to reduce the total number of HARQ-ACK bits to be reported to a number of spatial bundled HARQ-ACK bits that equals the number of component carriers. Performing partial HARQ-ACK bundling may further include dividing the number of component carriers by the number of HARQ-ACK bits that can be carried on the PUCCH to obtain a number of bits per bundle. Performing partial HARQ-ACK bundling may also include bundling a next unbundled number of bits per bundle into a next bundled HARQ-ACK bit.

Performing partial HARQ-ACK bundling may include computing k that is equal to a number of remaining HARQ-ACK bits to be reported divided by a number of bundled HARQ-ACK bits available. Performing partial HARQ-ACK bundling may also include determining that a k-th bit in the remaining HARQ-ACK bits to be reported is the only bit or the second bit. Performing partial HARQ-ACK bundling may further include bundling the next k unbundled bits of the remaining HARQ-ACK bits to be reported into one bundled HARQ-ACK bit.

Performing partial HARQ-ACK bundling may include computing k that is equal to a number of remaining HARQ-ACK bits to be reported divided by a number of bundled HARQ-ACK bits available. Performing partial HARQ-ACK bundling may also include determining that a k-th bit in the remaining HARQ-ACK bits to be reported is the first bit. Performing partial HARQ-ACK bundling may further include bundling the next k−1 bits of the remaining HARQ-ACK bits to be transmitted into one bundled HARQ-ACK bit.

Performing partial HARQ-ACK bundling may include determining a number of acknowledgements (ACKs) in the HARQ-ACK bits to be reported. Performing partial HARQ-ACK bundling may also include using a mapping table to obtain bundled HARQ-ACK bits. Performing partial HARQ-ACK bundling may further include reporting the bundled HARQ-ACK bits.

Using a backward compatible PUCCH format may include determining that the number of bits for the CQI/PMI/RI plus the total number of HARQ-ACK bits to be reported is less than or equal to a PUCCH capacity. Using a backward compatible PUCCH format may also include sending all the HARQ-ACK bits to be reported with the CQI/PMI/RI bits. Using a backward compatible PUCCH format may further include reusing a Release-8/9 PUCCH format to send the number of bits for the CQI/PMI/RI and the total number of HARQ-ACK bits to be reported as bundled HARQ-ACK bits.

Using a backward compatible PUCCH format may include determining that the number of bits for the CQI/PMI/RI plus the total number of HARQ-ACK bits to be reported is greater than a PUCCH capacity. Using a backward compatible PUCCH format may also include determining that the number of bits for the CQI/PMI/RI plus a number of component carriers is less than or equal to the PUCCH capacity. Using a backward compatible PUCCH format may further include performing spatial bundling on each component carrier to reduce the total number of HARQ-ACK bits to be reported to a number of spatial bundled HARQ-ACK bits that is equal to the number of component carriers. Using a backward compatible PUCCH format may also include reporting the spatial bundled HARQ-ACK bits with the CQI/PMI/RI bits. Using a backward compatible PUCCH format may further include reusing a Release-8/9 PUCCH format to send the number of bits for the CQI/PMI/RI and the number of spatial bundled HARQ-ACK bits.

Using a backward compatible PUCCH format may include determining that the number of bits for the CQI/PMI/RI plus the total number of HARQ-ACK bits to be reported is greater than a PUCCH capacity. Using a backward compatible PUCCH format may also include determining that the number of bits for the CQI/PMI/RI plus a number of component carriers is greater than the PUCCH capacity. Using a backward compatible PUCCH format may further include applying spatial and cross-component carrier bundling to reduce the total number of HARQ-ACK bits to be reported to a number of bundled HARQ-ACK bits. The number of bundled HARQ-ACK bits may be equal to the PUCCH capacity minus the number of bits for the CQI/PMI/RI. Using a backward compatible PUCCH format may also include reporting the bundled HARQ-ACK bits with the CQI/PMI/RI bits. Using a backward compatible PUCCH format may further include reusing a Release-8/9 PUCCH format to send the number of bits for the CQI/PMI/RI and the number of bundled HARQ-ACK bits.

The physical channel structure may have an extended cyclic prefix (CP). The CQI/PMI/RI bits and the bundled HARQ-ACK bits may be concatenated. The concatenated bits may be joint coded. The joint coded concatenated bits may be sent on the PUCCH using Format 2.

The physical channel structure may have a normal cyclic prefix (CP). The last two of the bundled HARQ-ACK bits may be carried on a $2^{nd}$ reference signal. The CQI/PMI/RI bits and all but the last two bundled HARQ-ACK bits may be concatenated. The concatenated bits may be joint coded. The joint coded concatenated bits may be sent on the PUCCH using Format 2b.

The physical channel structure may have a normal cyclic prefix (CP). A PUCCH capacity may be set to thirteen. The CQI/PMI/RI bits and the bundled HARQ-ACK bits may be concatenated. The concatenated bits may be joint coded. The joint coded concatenated bits may be sent on the PUCCH using Format 2.

The physical channel may have a normal cyclic prefix (CP). A PUCCH capacity may be set to fifteen. A difference between a payload and a PUCCH capacity may be computed. The difference between the payload and the PUCCH capacity may be the PUCCH capacity minus the number of bits for the CQI/PMI/RI plus the number of HARQ-ACK bits that can be carried on the PUCCH. It may be determined that the difference between the payload and the PUCCH capacity is greater than or equal to two. The CQI/PMI/RI bits and the bundled HARQ-ACK bits may be concatenated. The concatenated bits may be joint coded. The joint coded concatenated bits may be sent on the PUCCH using Format 2.

The physical channel may have a normal cyclic prefix (CP). A PUCCH capacity may be set to fifteen. A difference between a payload and a PUCCH capacity may be computed. The difference between the payload and the PUCCH capacity may be the PUCCH capacity minus the number of bits for the CQI/PMI/RI plus the number of HARQ-ACK bits that can be carried on the PUCCH. It may be determined that the difference between the payload and the PUCCH capacity is equal to one. A last bundled HARQ-ACK bit may be carried on a $2^{nd}$ reference symbol. The CQI/PMI/RI bits and the bundled HARQ-ACK bits minus the last bundled HARQ-ACK bit may be concatenated. The concatenated bits may be joint coded. The joint coded concatenated bits may be sent on the PUCCH using Format 2a.

The physical channel may have a normal cyclic prefix (CP). A PUCCH capacity may be set to fifteen. A difference between a payload and a PUCCH capacity may be computed. The difference between the payload and the PUCCH capacity may be the PUCCH capacity minus the number of bits for the CQI/PMI/RI plus the number of HARQ-ACK bits that can be carried on the PUCCH. It may be determined that the difference between the payload and the PUCCH capacity is equal to zero. A last two bundled HARQ-ACK bits may be carried on a $2^{nd}$ reference symbol. The CQI/PMI/RI bits and the bundled HARQ-ACK bits minus the last two bundled HARQ-ACK bits may be concatenated. The concatenated bits may be joint coded. The joint coded concatenated bits may be sent on the PUCCH using Format 2b.

A user equipment (UE) configured for reporting uplink control information (UCI) is also described. The user equipment (UE) may include a processor, memory in electronic communication with the processor, and instructions stored in the memory. The instructions are executable for obtaining a number of bits for a channel quality indicator and/or a precoding matrix index and/or a rank indication (CQI/PMI/RI). The instructions are also executable for obtaining a number of component carriers with hybrid automatic repeat request acknowledgement (HARQ-ACK) reporting. The instructions are further executable for obtaining a total number of HARQ-ACK bits to be reported. The instructions are also executable for determining a number of HARQ-ACK bits that can be carried on the physical uplink control channel (PUCCH). The instructions are further executable for performing bundling on the total number of HARQ-ACK bits to be reported to fit the total number of HARQ-ACK bits to be reported into the number of HARQ-ACK bits that can be carried on the PUCCH. The instructions are also executable for using a backward compatible PUCCH format to simultaneously carry the CQI/PMI/RI bits and the bundled HARQ-ACK bits.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE and LTE-Advanced standards (e.g., Release-8, Release-9 and Release-10). However, the scope of the present disclosure should not be limited in this regard. At least some aspects of the systems and methods disclosed herein may be utilized in other types of wireless communication systems.

The term "simultaneous" may be used herein to denote a situation where two or more events occur in overlapping time frames. In other words, two "simultaneous" events may overlap in time to some extent, but are not necessarily of the same duration. Furthermore, simultaneous events may or may not begin or end at the same time.

FIG. 1 is a block diagram illustrating a wireless communication system 100 using uplink control information (UCI) multiplexing. An eNode B 102 may be in wireless communication with one or more user equipments (UEs) 104. An eNode B 102 may be referred to as an access point, a Node B, a base station or some other terminology. Likewise, a user equipment (UE) 104 may be referred to as a mobile station, a subscriber station, an access terminal, a remote station, a user terminal, a terminal, a handset, a subscriber unit, a wireless communication device, or some other terminology.

Communication between a user equipment (UE) 104 and an eNode B 102 may be accomplished using transmissions over a wireless link, including an uplink and a downlink. The uplink refers to communications sent from a user equipment (UE) 104 to an eNode B 102. The downlink refers to communications sent from an eNode B 102 to a user equipment (UE) 104. The communication link may be established using a single-input and single-output (SISO), multiple-input and single-output (MISO) or a multiple-input and multiple-output (MIMO) system. A MIMO system may include both a transmitter and a receiver equipped with multiple transmit and receive antennas. Thus, an eNode B 102 may have multiple antennas and user equipment (UE) 104 may have multiple antennas. In this way, the eNode B 102 and the user equipment (UE) 104 may each operate as either a transmitter or a receiver in a MIMO system. One benefit of a MIMO system is improved performance if the additional dimensionalities created by the multiple transmit and receive antennas are utilized.

The user equipment (UE) 104 communicates with an eNode B 102 using one or more antennas 199a-n. The user equipment (UE) 104 may include a transceiver 117, a decoder 127, an encoder 131 and an operations module 133. The transceiver 117 may include a receiver 119 and a transmitter 123. The receiver 119 may receive signals from the eNode B 102 using one or more antennas 199a-n. For example, the receiver 119 may receive and demodulate received signals using a demodulator 121. The transmitter 123 may transmit signals to the eNode B 102 using one or more antennas 199a-n. For example, the transmitter 123 may modulate signals using a modulator 125 and transmit the modulated signals.

The receiver 119 may provide a demodulated signal to the decoder 127. The user equipment (UE) 104 may use the decoder 127 to decode signals and make downlink decoding results 129. The downlink decoding results 129 may indicate whether data was received correctly. For example, the downlink decoding results 129 may indicate whether a packet was correctly or erroneously received (i.e., positive acknowledgement, negative acknowledgement or discontinuous transmission (no signal)).

The operations module 133 may be a software and/or hardware module used to control user equipment (UE) 104 communications. For example, the operations module 133 may determine when the user equipment (UE) 104 requires resources to communicate with an eNode B 102.

In 3$^{rd}$ Generation Partnership Project (3GPP) Long Term Evolution (LTE)—Advanced, additional control feedback will have to be sent on control channels to accommodate MIMO and carrier aggregation (CA). Carrier aggregation refers to transmitting data on multiple component carriers (CC) that are contiguously or separately located. Both the hybrid automatic repeat and request (ARQ) acknowledgement (HARQ-ACK) with positive-acknowledge and negative-acknowledge (ACK/NACK) bits and other control information may be transmitted using the physical uplink control channel (PUCCH).

The user equipment (UE) 104 may transmit uplink control information (UCI) to an eNode B 102 on the uplink. The uplink control information (UCI) may include a channel quality indicator (CQI), a precoding matrix index (PMI), rank indication (RI), a scheduling request (SR) and a hybrid automatic repeat request acknowledgement (HARQ-ACK) 140a. HARQ-ACK 140a means ACK (positive-acknowledgement) and/or NACK (negative-acknowledgement) and/or DTX (discontinuous transmission) responses for HARQ operation, also known as ACK/NACK. In one configuration, the CQI/PMI/RI 141a and the HARQ-ACK 140a may be separately coded. In another configuration, the CQI/PMI/RI 141a and the HARQ-ACK 140a may be jointly coded. Herein, CQI/PMI/RI 141 refers to CQI and/or PMI and/or RI. CQI/PMI/RI 141 may also be referred to as channel state information (CSI). The CQI and/or PMI and/or RI may be reported together or independently based on the physical uplink control channel (PUCCH) reporting modes. ACK/NACK refers to ACK and/or NACK. CQI/PMI/RI 141 and HARQ-ACK 140 refers to ((CQI and/or PMI and/or RI) AND HARQ-ACK 140). CQI/PMI/RI 141 or HARQ-ACK refers to ((CQI and/or PMI and/or RI) OR HARQ-ACK 140).

The CQI/PMI/RI 141a and the HARQ-ACK 140a may be generated by the uplink control information (UCI) reporting module 114 and transferred to a CQI/PMI/RI and HARQ-ACK encoder 156 that is part of the encoder 131. The CQI/PMI/RI and HARQ-ACK encoder 156 may generate uplink control information (UCI) using backwards compatible physical uplink control channel (PUCCH) formats. Backwards compatible physical uplink control channel (PUCCH) formats are those formats that may be used by Release-10 user equipments (UEs) 104 as well as Release-8/9 user equipments (UEs) 104. The CQI/PMI/RI and HARQ-ACK encoder 156 may include a bundling module 157. Bundling refers to grouping together multiple HARQ-ACK 140 bits into a single bundled HARQ-ACK 140 bit. Bundling is discussed in further detail below in relation to FIG. 5.

In LTE Release-8/9, physical uplink control channel (PUCCH) Format 1/1a/1b is used to report the HARQ-ACK 140a and physical uplink control channel (PUCCH) Format 2 is used to report periodic CQI/PMI/RI 141a. When a collision between periodic CQI/PMI/RI 141a and HARQ-ACK 140a reporting on the physical uplink control channel (PUCCH) occurs, Format 2 with joint coding for extended cyclic prefix (CP) or Format 2a/2b for normal cyclic prefix (CP) can be used to report the CQI/PMI/RI 141a and the HARQ-ACK 140a simultaneously.

To report the HARQ-ACK 140 on the physical uplink control channel (PUCCH), for Release-10 user equipments (UEs) 104 that support up to four HARQ-ACK 140 bits, physical uplink control channel (PUCCH) Format 1a/1b with channel selection should be used. Since the new Format 3 is not supported by these user equipments (UEs) 104, a backward compatible physical uplink control channel (PUCCH) format should be reused.

For Release-10 user equipments (UEs) 104 that support more than four HARQ-ACK 140 bits, physical uplink control channel (PUCCH) Format 1a/1b can also be used for up to four bits of HARQ-ACK 140 reporting. Thus, the backward compatible physical uplink control channel (PUCCH) format should also be used.

A new DFT-S-OFDM based Format 3 can be used for Release-10 user equipments (UEs) 104 that support more than four HARQ-ACK 140 bits, regardless of the actual HARQ-ACK 140 payload sizes. Because of cubic metric issues, only one physical uplink control channel (PUCCH) signal should be transmitted at any given time interval (or transmission time interval (TTI)). With simultaneous CQI/PMI/RI 141 and HARQ-ACK 140 reporting, a backward compatible physical uplink control channel (PUCCH) Format 2/2a/2b based method may also be used in the previous cases. A method for simultaneous reporting using the new Format 3 is possible but only limited to this particular use case.

By applying the same backward compatible physical uplink control channel (PUCCH) format for simultaneous CQI/PMI/RI 141 and HARQ-ACK 140 reporting, the design is simplified and system complexity is reduced. However, the Release-8/9 physical uplink control channel (PUCCH) formats support up to two bits HARQ-ACK 140 only. A method to support more than two bits of HARQ-ACK 140 needs to be specified.

Format 3 is a new format for LTE-A which carries 48 coded bits. One benefit of using Format 3 is that Format 3 can carry a larger size of payload than the other formats and can achieve more robustness using a small size of payload.

The user equipment (UE) 104 may also transmit a reference signal (RS) to an eNode B 102. The uplink control information (UCI) may be transmitted using the physical uplink control channel (PUCCH). One or more physical uplink control channel (PUCCH) reference signal (RS) symbols are included in a physical uplink control channel (PUCCH) signal transmission on each slot. Depending on the size of the uplink control information (UCI) payload, new methods of transmitting the uplink control information (UCI) to an eNode B 102 may be necessary.

In LTE Release-8, only one uplink component carrier (CC) and one downlink component carrier (CC) can be used for each user equipment (UE) 104. The uplink control information (UCI) such as ACK/NACK bits for hybrid ARQ (HARQ) 140a and periodic channel quality indicators (CQI), precoding matrix index (PMI) and rank indication (RI) can be sent on the physical uplink control channel (PUCCH) or on the physical uplink shared channel (PUSCH). In one configuration, there may be a first uplink control information (UCI) that is scheduled on the physical uplink control channel (PUCCH) and a second uplink control information (UCI) that is scheduled on the physical uplink shared channel (PUSCH). In some conditions, for example in cases where a collision between the physical uplink control channel (PUCCH) and the physical uplink shared channel (PUSCH) occurs, the uplink control information (UCI) that is scheduled on the physical uplink control channel (PUCCH) may be transmitted on the physical uplink shared channel (PUSCH).

The physical uplink control channel (PUCCH) may occupy one resource block (RB) at each slot. Thus, a very limited amount of information can be transmitted on the physical uplink control channel (PUCCH). With physical uplink control channel (PUCCH) Format 1/1a/1b, only one or two ACK/NACK bits are transmitted. With physical uplink control channel (PUCCH) Format 2/2a/2b, one or two ACK/NACK bits can be simultaneously transmitted with four to eleven bits of CQI/PMI/RI 141. Thus, the maximum payload size that can be carried on a Release-8 physical uplink control channel (PUCCH) is thirteen bits.

Format 1 a may be used for a one bit HARQ-ACK 140. Format 1 a may also be used for a one bit HARQ-ACK 140 with positive scheduling request (SR) in frequency division duplexing (FDD). Format 1b may be used for a two bit HARQ-ACK 140 or for a two bit HARQ-ACK 140 with a positive scheduling request (SR). Format 1b may also be used for an HARQ-ACK 140 with channel selection. Format 1 may be used for a positive scheduling request (SR).

Format 2 may be used for a CQI/PMI/RI report when the CQI/PMI/RI report is not multiplexed with the HARQ-ACK 140. Format 2 may also be used for a CQI/PMI/RI report when the CQI/PMI/RI report is multiplexed with the HARQ-ACK 140 for extended cyclic prefix. Format 2a may be used for a CQI/PMI/RI report that is multiplexed with a one bit HARQ-ACK 140 for normal cyclic prefix. Format 2b may be used for a CQI/PMI/RI report that is multiplexed with a two bit HARQ-ACK 140 for normal cyclic prefix. The problem is how to multiplex the CQI/PMI/RI 141 and more than two bits of HARQ-ACK 140 for carrier aggregation.

In 3GPP Long Term Evolution (LTE) Release 10 (LTE-A or Advanced EUTRAN), carrier aggregation was introduced. Carrier aggregation may also be referred to as cell aggregation. Carrier aggregation is supported in both the uplink and the downlink with up to five component carriers, also known as cells. Each component carrier or cell may have a transmission bandwidth of up to 110 resource blocks. In carrier aggregation, two or more component carriers or cells are aggregated to support wider transmission bandwidths up to 100 megahertz (MHz). A user equipment (UE) 104 may simultaneously receive or transmit one or multiple component carriers or cells, depending on the capabilities of the user equipment (UE) 104.

Based on current agreements, cyclic CQI/PMI/RI 141 reporting of each component carrier is supported in Release-10. Thus, the same CQI/PMI/RI payload as in Release 8 can be used. Therefore, a Format 2 based physical uplink control channel (PUCCH) may be reused for periodic CQI/PMI/RI 141 reporting of each component carrier or cell.

For LTE Release-10 and beyond, in case of a collision between a CQI/PMI/RI 141 and an HARQ-ACK 140 in the same subframe on the physical uplink control channel (PUCCH), the CQI/PMI/RI 141 may be dropped as in Release 8/9. Because LTE Release-10 and beyond has multiple component carriers or cells using cyclic CQI/PMI/RI 141 reporting, the interval between the next reporting of the same component carrier or cell may be longer than that of Release-8/9. Dropping a CQI/PMI/RI 141 may cause poor channel estimation. Therefore, a method for the simultaneous reporting of CQI/PMI/RI 141 and HARQ-ACK 140 should be supported in Release-10.

The uplink control information (UCI) generated by the uplink control information (UCI) reporting module 114 may be dependent on a simultaneousAckNackAndCQI parameter 116. For example, the format used for transmitting the uplink control information (UCI) may be dependent on the simultaneousAckNackAndCQI parameter 116. The simultaneousAckNackAndCQI parameter 116 may be provided by higher layers 118 (e.g., the radio resource control (RRC) layer) on the user equipment (UE) 104. The simultaneousAckNackAndCQI parameter may be used by the user equipment (UE) 104 to determine whether to use CQI/PMI/RI 141 dropping or simultaneous reporting. The choice of CQI/PMI/RI 141 dropping or simultaneous reporting may be configured by the eNode B 102. For example, simultaneous CQI/PMI/RI 141 and HARQ-ACK 140 reporting should be used if the simultaneousAckNackAndCQI parameter 116 is set to TRUE. Otherwise, the CQI/PMI/RI 141 should be dropped.

A user equipment (UE) 104 may communicate with an eNode B 102 using multiple cells 185 at the same time. For example, a user equipment (UE) 104 may communicate with an eNode B 102 using a primary cell (PCell) 185*a* while simultaneously communicating with the eNode B 102 using secondary cells (SCell) 185*b*.

An eNode B 102 may include a transceiver 107 that includes a receiver 109 and a transmitter 113. An eNode B 102 may additionally include a decoder 103, an encoder 105 and an operations module 194. An eNode B 102 may receive uplink control information (UCI) using its one or more antennas 197*a-n* and its receiver 109. The receiver 109 may use the demodulator 111 to demodulate the uplink control information (UCI).

The decoder 103 may include an uplink control information (UCI) receiving module 195. An eNode B 102 may use the uplink control information (UCI) receiving module 195 to decode and interpret the uplink control information (UCI) received by the eNode B 102. The eNode B 102 may use the decoded uplink control information (UCI) to perform certain operations, such as retransmit one or more packets based or schedule communication resources for the user equipment (UE) 104. The uplink control information (UCI) may include a CQI/PMI/RI 141*b* and/or an HARQ-ACK 140*b*.

The operations module 194 may include a retransmission module 196 and a scheduling module 198. The retransmission module 196 may determine which packets to retransmit (if any) based on the uplink control information (UCI). The scheduling module 198 may be used by the eNode B 102 to schedule communication resources (e.g., bandwidth, time slots, frequency channels, spatial channels, etc.). The scheduling module 198 may use the uplink control information (UCI) to determine whether (and when) to schedule communication resources for the user equipment (UE) 104.

The operations module 194 may provide data 101 to the encoder 105. For example, the data 101 may include packets for retransmission and/or a scheduling grant for the user equipment (UE) 104. The encoder 105 may encode the data 101, which may then be provided to the transmitter 113. The transmitter 113 may modulate the encoded data using the modulator 115. The transmitter 113 may transmit the modulated data to the user equipment (UE) 104 using one or more antennas 197*a-n*.

When carrier aggregation is configured, a user equipment (UE) 104 may have only one Radio Resource Control (RRC) connection with the network. At the RRC connection establishment/re-establishment/handover, one serving cell (i.e., the primary cell (PCell) 185*a*) provides the non-access stratum (NAS) mobility information (e.g., Tracking Area Identity (TAI)) and the security input.

In the downlink, the carrier corresponding to the primary cell (PCell) 185*a* is the downlink primary component carrier (DL PCC) 108 (also referred to as the downlink primary cell (DL PCell)). In the uplink, the carrier corresponding to the primary cell (PCell) 185*a* is the uplink primary component carrier (UL PCC) 106 (also referred to as the uplink primary cell (UL PCell)). Depending on the capabilities of the user equipment (UE) 104, one or more secondary component carriers (SCC) or secondary cells (SCell) 185*b* may be configured to form a set of serving cells with the primary cell (PCell) 185*a*. In the downlink, the carrier corresponding to the secondary cell (SCell) 185*b* is the downlink secondary component carrier (DL SCC) 112 (also referred to as the downlink secondary cell (DL SCell)). In the uplink, the carrier corresponding to the secondary cell (SCell) 185*b* is the uplink secondary component carrier (UL SCC) 110 (also referred to as the uplink secondary cell (UL SCell)). The number of downlink component carriers or cells may be different from the number of uplink component carriers or cells because multiple cells may share one uplink component carrier cell.

If carrier aggregation is configured, a user equipment (UE) 104 may have multiple serving cells: a primary cell (PCell) 185*a* and one or more secondary cells (SCell) 185*b*. From a network perspective, the same serving cell may be used as the primary cell (PCell) 185*a* by one user equipment (UE) 104 and used as a secondary cell (SCell) 185*b* by another user equipment (UE) 104. A primary cell (PCell) 185*a* that is operating according to Release-8/9 is equivalent to the Release-8/9 serving cell. When operating according to Release-10, there may be one or more secondary cells (SCell) 185*b* in addition to the primary cell (PCell) 185*a* if carrier aggregation is configured.

A number of spatial channels may be available on each serving cell by using multiple antennas at a transmitter and a receiver. Therefore, multiple codewords (up to two codewords) may be transmitted simultaneously. If the user equipment (UE) 104 is configured with five component carriers and two codewords for each of the component carriers, ten HARQ-ACK 140 acknowledgement/negative acknowledgement (ACK/NACK) bits for a single downlink subframe may be generated by the user equipment (UE) 104 for a single uplink subframe. One benefit of using carrier aggregation is that additional downlink and/or uplink data may be transmitted.

It has been agreed that for periodic CQI/PMI/RI 141 reporting for carrier aggregation, the configuration of different (in time) physical uplink control channel (PUCCH) resources for reports for each component carrier (CC) is supported. It has also been agreed that for Release-10 user equipments (UEs) 104 that support up to four HARQ-ACK 140 bits, physical uplink control channel (PUCCH) Format 1 b with channel selection should be used. For Release-10 user equipments (UEs) 104 that support more than four HARQ-ACK 140 bits, physical uplink control channel (PUCCH) Format 1b with channel selection can be used for up to four HARQ-ACK bits. Format 3 is supported for all HARQ-ACK 140 bit ranges. Format 3 is a new format for LTE-A, which can carry 48 coded bits. Format 3 is based on a discrete Fourier Transform spread orthogonal frequency division multiplexing (DFT-S-OFDM) structure.

In Release-8/9, the maximum number of bits for HARQ-ACK 140 is two bits for frequency division duplexing (FDD) using Format 1b or Format 2/2b and four bits for time division duplexing (TDD) using Format 1 b with channel selection. For frequency division duplexing (FDD), a user equipment (UE) 104 may determine the number of configured serving cells and the downlink transmission modes configured for each serving cell. A user equipment (UE) 104 may use two HARQ-ACK 140 bits for a serving cell configured with a downlink transmission mode that supports up to two transport blocks (codewords), and one HARQ-ACK 140 bit otherwise. A user equipment (UE) 104 that supports more than four ACK/NACK bits may be configured by higher layer signaling to use either physical uplink control channel (PUCCH) Format 1a/1b with channel selection or physical uplink control channel (PUCCH) Format 3 for transmission of the HARQ-ACK 140. It has also been agreed that for HARQ-ACK 140 reporting for frequency division duplexing (FDD) under the power limited case, no downlink assignment index (DAI) is used and no carrier-domain HARQ-ACK 140 bundling is supported. This is also the baseline for the case of channel selection with simultaneous scheduling request (SR) or CQI.

Figure 2:
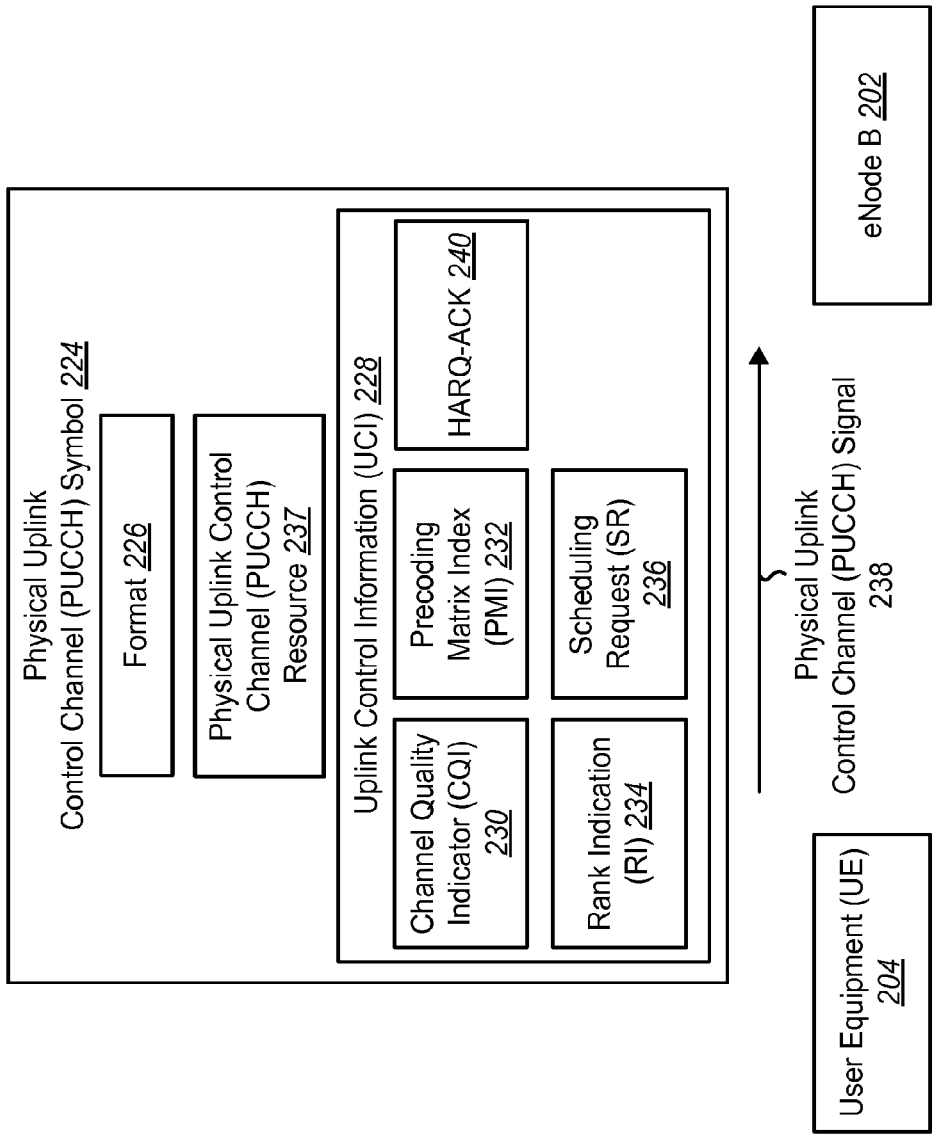
FIG. 2 is a block diagram illustrating transmissions from a user equipment (UE) to an eNode B.

FIG. 2 is a block diagram illustrating transmissions from a user equipment (UE) 204 to an eNode B 202. The user equipment (UE) 204 may transmit a physical uplink control channel (PUCCH) symbol 224 via a physical uplink control channel (PUCCH) signal 238 to the eNode B 202.

The physical uplink control channel (PUCCH) symbol 224 may include uplink control information (UCI) 228. The uplink channel information (UCI) 228 may include a channel quality indicator (CQI) 230, a precoding matrix index (PMI) 232, a rank indication (RI) 234, a scheduling request (SR) 236 and/or an HARQ-ACK 240. The CQI/PMI/RI 141 may be scheduled on the physical uplink control channel (PUCCH) periodically by higher layer signaling. The physical uplink control channel (PUCCH) may be sent only on the primary cell (PCell) 185*a*, while the physical uplink shared channel (PUSCH) may be sent on the primary cell (PCell) 185*a* and/or on one or more secondary cells (SCell) 185*b*. The HARQ-ACK 240 is generated dynamically based on the detection of a physical downlink shared channel (PDSCH). A collision may occur between a CQI/PMI/RI 141 and an HARQ-ACK 240 in the same subframe.

The physical uplink control channel (PUCCH) symbol 224 may further include a format 226 for which the physical uplink control channel (PUCCH) symbol 224 was transmitted. For example, the physical uplink control channel (PUCCH) symbol 224 may be transmitted using Format 1/1a/1b, Format 2/2a/2b, Format 3 or any other new formats. As used herein, Format 1/1a/1b represents Format 1 and/or Format 1 a and/or Format 1 b. Also, as used herein, Format 2/2a/2b represents Format 2 and/or Format 2a and/or Format 2b. The physical uplink control channel (PUCCH) symbol 224 may also include a physical uplink control channel (PUCCH) resource 237. The physical uplink control channel (PUCCH) resource 237 for the CQI/PMI/RI 141 may be periodically pre-assigned by a higher layer, which uses Format 2/2a/2b. The eNode B 202 may dynamically allocate the physical downlink shared channel (PDSCH); the HARQ-ACK 240 is then dynamically generated in a subframe. Therefore, sometimes the CQI/PMI/RI 141 may collide with the HARQ-ACK 240 is the same subframe.

To avoid dropping one of them in collisions between a CQI/PMI/RI 141 and an HARQ-ACK 240, the CQI/PMI/RI 141 may be multiplexed with the HARQ-ACK 240 on the physical uplink control channel (PUCCH). This is because of the single carrier property for uplink in an LTE system (i.e., a user equipment (UE) 204 should not transmit multiple channels simultaneously on one component carrier). Format 3 may be used for multiplexing the CQI/PMI/RI 141 with the HARQ-ACK 240. If the CQI/PMI/RI 141 and the HARQ-ACK 240 are not multiplexed, the CQI/PMI/RI 141 may be dropped by the user equipment (UE) 204. Thus, one benefit of using Format 3 is that the CQI/PMI/RI 141 may be multiplexed with the HARQ-ACK 240, allowing for the uplink transmission of additional data.

A user equipment (UE) 204 that supports up to four ACK/NACK bits can use physical uplink control channel (PUCCH) Format 1 a/1b with channel selection for transmission of the HARQ-ACK 240. A user equipment (UE) 204 that supports more than four ACK/NACK bits is configured by higher layer 118 signaling to use either physical uplink control channel (PUCCH) Format 1a/1b with channel selection or physical uplink control channel (PUCCH) Format 3 for transmission of the HARQ-ACK 240. A user equipment (UE) 204 may determine the number of HARQ-ACK 240 bits based on the number of configured serving cells and the downlink transmission modes configured for each serving cell. A user equipment (UE) 204 may use two HARQ-ACK 240 bits for a serving cell configured with a downlink transmission mode that supports up to two transport blocks and one HARQ-ACK 240 bit otherwise.

For physical uplink control channel (PUCCH) Format 3, a user equipment (UE) 204 may transmit a NACK for a DTX HARQ-ACK 240 response for a transport block associated with a configured serving cell. DTX means that the user equipment (UE) 204 has missed the downlink assignment.

Figure 3:
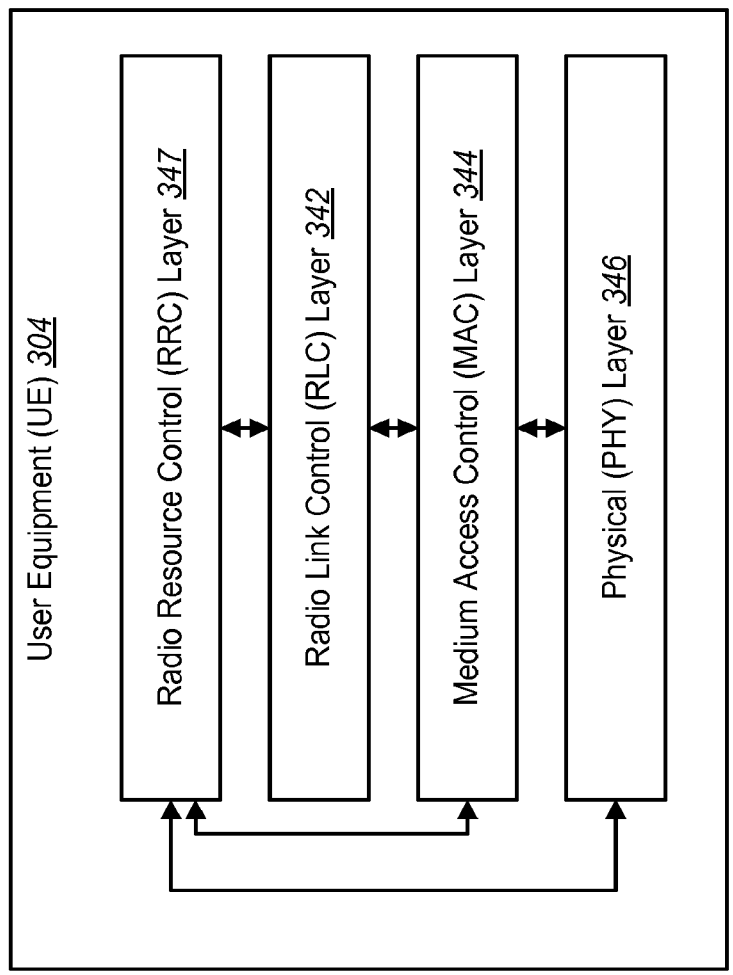
FIG. 3 is a block diagram illustrating the layers used by a user equipment (UE)

FIG. 3 is a block diagram illustrating the layers used by a user equipment (UE) 304. The user equipment (UE) 304 of FIG. 3 may be one configuration of the user equipment (UE) 104 of FIG. 1. The user equipment (UE) 304 may include a radio resource control (RRC) layer 347, a radio link control (RLC) layer 342, a medium access control (MAC) layer 344 and a physical (PHY) layer 346. These layers may be referred to as higher layers 118. The user equipment (UE) 304 may include additional layers not shown in FIG. 3.

Figure 4:
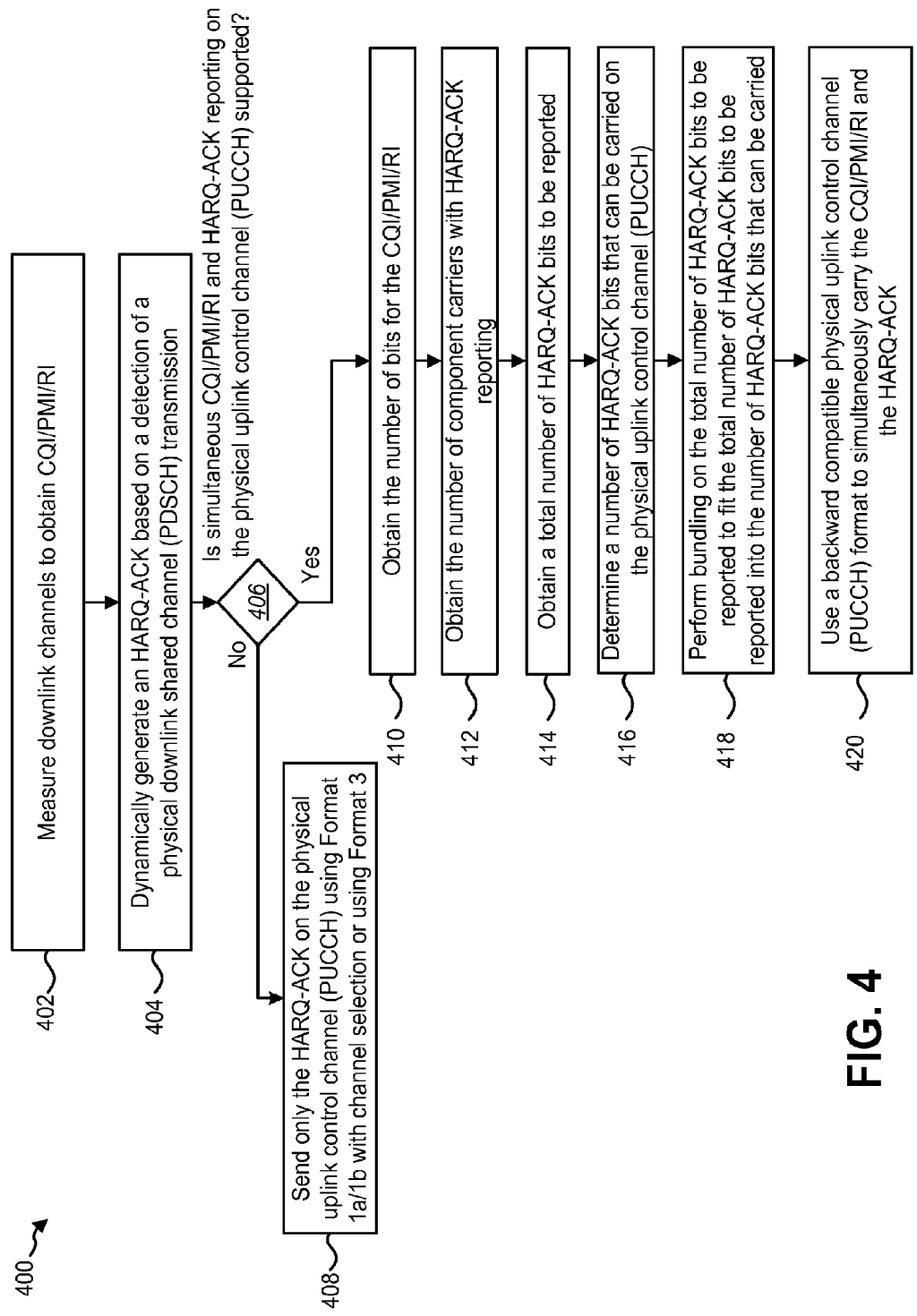
FIG. 4 is a flow diagram of a method for simultaneously transmitting the CQI/PMI/RI and the HARQ-ACK using backward compatible physical uplink control channel (PUCCH) formats.

FIG. 4 is a flow diagram of a method 400 for simultaneously transmitting the CQI/PMI/RI 141 and the HARQ-ACK 140 using backward compatible physical uplink control channel (PUCCH) formats. The method 400 may be performed by a user equipment (UE) 104. The backward compatible physical uplink control channel (PUCCH) formats may be physical uplink control channel (PUCCH) 2/2a/2b based formats.

The user equipment (UE) 104 may measure 402 downlink channels to obtain the CQI/PMI/RI 141. The user equipment (UE) 104 may also dynamically generate 404 an HARQ-ACK 140 based on a detection of a physical downlink shared channel (PDSCH) transmission. The user equipment (UE) 104 may then determine 406 whether simultaneous CQI/PMI/RI 141 and HARQ-ACK 140 reporting on the physical uplink control channel (PUCCH) is supported. As discussed above in relation to FIG. 1, the simultaneousAckNackAndCQI parameter 116 may indicate to the user equipment (UE) 104 whether or not to allow simultaneous CQI/PMI/RI 141 and HARQ-ACK 140 reporting. The simultaneousAckNackAndCQI parameter 116 may be configured by an eNode B 102 at higher layers.

If the simultaneousAckNackAndCQI parameter 116 is set to FALSE, no simultaneous CQI/PMI/RI 141 and HARQ-ACK 140 reporting is allowed and the user equipment (UE) 104 should send 408 only the HARQ-ACK 140 on the physical uplink control channel (PUCCH) using the corresponding physical uplink control channel (PUCCH) formats for HARQ-ACK 140 reporting.

If the simultaneousAckNackAndCQI parameter 116 is set to TRUE, simultaneous CQI/PMI/RI 141 and HARQ-ACK 140 reporting should be used. If simultaneous CQI/PMI/RI 141 and HARQ-ACK 140 reporting is configured, the user equipment (UE) 104 may obtain 410 the number $N_{CQI}$ of bits for the CQI/PMI/RI 141 for a transmission time interval (TTI). The number $N_{CQI}$ of bits for the CQI/PMI/RI 141 is decided by the periodic CQI/PMI/RI 141 reporting type and modes configured by the eNode B 102. The user equipment (UE) 104 may also obtain 412 the number $N_{DL\_CC}$ of downlink serving cells (also referred to as component carriers) with HARQ-ACK 140 bits to be reported for the TTI. The number $N_{DL\_CC}$ of downlink component carriers may be obtained 412 by determining the number of configured serving cells or component carriers.

The user equipment (UE) 104 may further obtain 414 a total number $N_{HARQ-ACK}$ of HARQ-ACK 140 bits for the TTI. The total number $N_{HARQ-ACK}$ of HARQ-ACK 140 bits may refer to unbundled bits. The total number $N_{HARQ-ACK}$ of HARQ-ACK 140 bits may be obtained 414 by determining the number of configured serving cells and the downlink transmission modes configured for each serving cell.

The user equipment (UE) 104 may determine 416 a number of HARQ-ACK 140 bits that can be carried on the physical uplink control channel (PUCCH). The number of HARQ-ACK 140 bits that can be carried on the physical uplink control channel (PUCCH) may depend on the size of the CQI/PMI/RI 141, the capabilities of the user equipment (UE) 104 and the number of secondary cells (SCell) 185b allocated for use by the user equipment (UE) 104. The number of HARQ-ACK 140 bits that can be carried on the physical uplink control channel (PUCCH) may be referred to as $N_{HARQ-ACK\_PUCCH}$.

The user equipment (UE) 104 may perform 418 bundling on the total number of HARQ-ACK 140 bits to be reported to fit the total number of HARQ-ACK 140 bits to be reported into the number of HARQ-ACK 140 bits that can be carried on the physical uplink control channel (PUCCH). Bundling is performed 418 if the total number of HARQ-ACK 140 bits to be reported is greater than the number of HARQ-ACK 140 bits that can be carried on the physical uplink control channel (PUCCH). Bundling may refer to full HARQ-ACK 140 bundling, partial HARQ-ACK 140 bundling, spatial bundling and cross (or inter-cell (or component carrier)) bundling.

Full HARQ-ACK 140 bundling refers to bundling the total number of HARQ-ACK 140 bits to be reported into one bundled HARQ-ACK 140 bit and is discussed below in relation to FIG. 5. Partial HARQ-ACK 140 bundling refers to bundling the total number of HARQ-ACK 140 bits to be reported into multiple bundled HARQ-ACK 140 bits and is discussed below in relation to FIGS. 5-9. Spatial bundling refers to bundling two bits on the same cell (or component carrier) into one bundled HARQ-ACK 140 bit and is discussed below in relation to 5. Cross (or inter-cell (or component carrier)) bundling refers to bundling two bits from different cells (or component carriers) into one bundled HARQ-ACK 140 bit and is discussed below in relation to FIG. 5.

The user equipment (UE) 104 may then use 420 a backward compatible physical uplink control channel (PUCCH) format to simultaneously carry the CQI/PMI/RI 141 and the HARQ-ACK 140. Several different methods for using a backward compatible physical uplink control channel (PUCCH) format are discussed below in relation to FIG. 5 and FIG. 10. Other methods besides those discussed may also be used. If multiple methods are allowed and specified for simultaneous CQI/PMI/RI 141 and HARQ-ACK 140 reporting with backward compatible physical uplink control channel (PUCCH) formats, the selection of the reporting method and corresponding physical uplink control channel (PUCCH) formats may be signaled by the eNode B 102 on the physical downlink control channel (PDCCH) or by explicit higher layer signaling. If only one method is adopted and specified for simultaneous CQI/PMI/RI 141 and HARQ-ACK 140 reporting with backward compatible physical uplink control channel (PUCCH) formats, the given method may be used without selection. One benefit of using a backward compatible physical uplink control channel (PUCCH) format is that a simpler design with reduced system complexity may be achieved.

Figure 5:
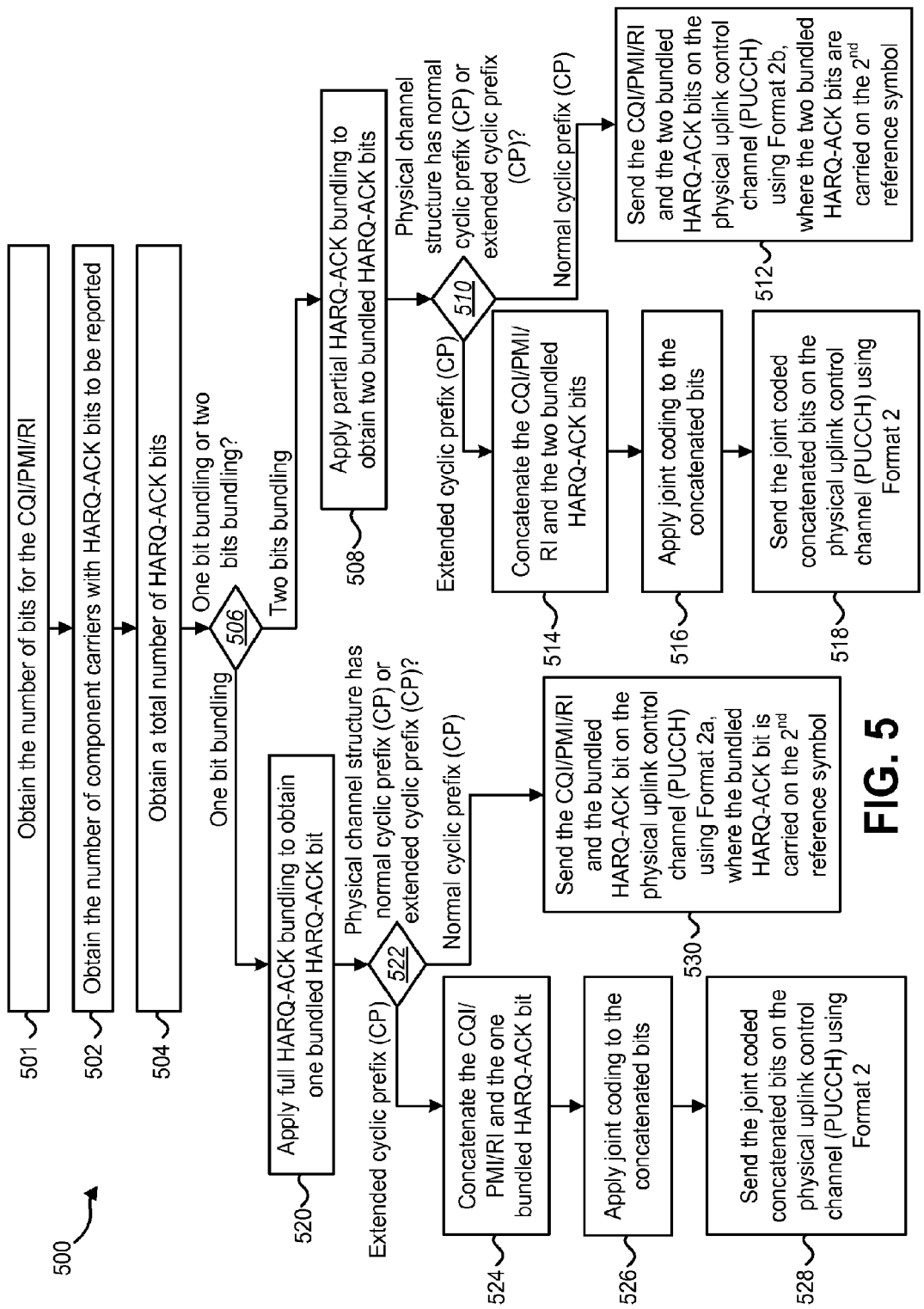
FIG. 5 is a flow diagram of a method for simultaneous CQI/PMI/RI and HARQ-ACK reporting with backward compatible physical uplink control channel (PUCCH) formats.

FIG. 5 is a flow diagram of a method 500 for simultaneous CQI/PMI/RI 141 and HARQ-ACK 140 reporting with backward compatible physical uplink control channel (PUCCH) formats. The method 500 may be one configuration for using a backward compatible physical uplink control channel (PUCCH) format to simultaneously carry the CQI/PMI/RI 141 and the HARQ-ACK 140 discussed above in relation to FIG. 4.

The method 500 may be performed by a user equipment (UE) 104. The user equipment (UE) 104 may obtain 501 the number $N_{CQI}$ of bits for the CQI/PMI/RI 141.

The user equipment (UE) 104 may also obtain 502 the number $N_{DL\_CC}$ of downlink component carriers with HARQ-ACK 140 bits to be reported. The user equipment (UE) 104 may further obtain 504 a total number $N_{HARQ-ACK}$ of HARQ-ACK 140 bits. When the number $N_{HARQ-ACK\_PUCCH}$ of HARQ-ACK 140 bits that can be carried on a physical uplink control channel (PUCCH) is less than the total umber $N_{HARQ-ACK}$ of HARQ-ACK 140 bits, some kind of HARQ-ACK 140 bundling is required. The bundling may be performed by a bundling module 157. Some HARQ-ACK 140 bundling may be needed to fit into backward compatible physical uplink control channel (PUCCH) formats.

The user equipment (UE) 104 may determine 506 whether one bit bundling or two bits bundling is used. An HARQ-ACK 140 bit may be represented by a binary value of 1 for ACK and a binary value of 0 for NACK feedback. In case of a discontinuous transmission (DTX) on a cell (or a component carrier) (i.e., the physical downlink control channel (PDCCH) of a cell (or a component carrier) is not detected), one or two bits with values of 0 may be reported as NACKs.

The HARQ-ACK 140 bundling may be performed with an AND operation. If there is a value of 0 in any HARQ-ACK 140 bits to be bundled, the bundled bit has a value of 0. The bundled bit only has a value of 1 if all the HARQ-ACK 140 bits to be bundled have a value of 1. HARQ-ACK 140 bundling reduces the number of HARQ-ACK 140 bits transmitted on the physical uplink control channel (PUCCH). However, HARQ-ACK 140 bundling introduces the overhead of packet retransmission because, for a bundled NACK feedback, all transport blocks (TBs) corresponding to the bundled HARQ-ACK 140 have to be retransmitted, even if some of them are correctly received.

One bit bundling may also be referred to as full HARQ-ACK 140 bundling. In full HARQ-ACK 140 bundling, the total number $N_{HARQ-ACK}$ of HARQ-ACK 140 bits are bundled into $N_{HARQ-ACK\_PUCCH}=1$ bundled HARQ-ACK 140 bit, as shown in Table 1.

TABLE 1

| CQI/PMI/ RI bits $N_{CQI}$ | Total HARQ-ACK bits $N_{HARQ-ACK}$ | HARQ-ACK bit with full bundling $N_{HARQ-ACK\_PUCCH}=1$ | Extended CP | Normal CP |
|---|---|---|---|---|
| 1-11 | 2-10 | b(0) | Format 2 | Format 2a |
| 1-11 | 2-10 | b(0) | with joint coding | |
| 1-11 | 2-10 | b(0) | | |
| 1-11 | 2-10 | b(0) | | |
| 1-11 | 2-10 | b(0) | | |

The user equipment (UE) 104 may apply 520 full HARQ-ACK 140 bundling to obtain one bundled HARQ-ACK 140 bit. The user equipment (UE) 104 may then determine 522 whether the physical channel structure has normal cyclic prefix (CP) or extended cyclic prefix (CP). For a physical channel structure with extended cyclic prefix (CP), the bundled HARQ-ACK 140 bit is concatenated 524 with CQI/PMI/RI 141 bits. A joint coding may be applied 526 to the concatenated bits. The user equipment (UE) 104 may then send 528 the joint coded concatenated bits on the physical uplink control channel (PUCCH) using Format 2. For a physical channel structure with normal cyclic prefix (CP), the user equipment (UE) 104 may send 530 the CQI/PMI/RI 141 and the one bundled HARQ-ACK 140 bit on the physical uplink control channel (PUCCH) using Format 2a, where the bundled HARQ-ACK 140 bit is carried on the $2^{nd}$ reference symbol.

HARQ-ACK 140 bundling may introduce more overhead on unnecessary retransmissions. Thus, full HARQ-ACK 140 bundling may cause the highest downlink transmission overhead. To reduce the overhead, partial HARQ-ACK 140 bundling may be used. In general, to give similar performance on bundled bits, the number of HARQ-ACK 140 bits for each bundled HARQ-ACK 140 bit should be the same or as close as possible. Furthermore, spatial bundling within a component carrier (CC) should be applied before cross or inter-cell (or component carrier) bundling.

Two bit bundling may also be referred to as partial HARQ-ACK 140 bundling. In partial HARQ-ACK 140 bundling, a portion of the HARQ-ACK 140 bits are bundled into a bundled HARQ-ACK 140 bit. Thus, the user equipment (UE) 104 may apply 508 partial HARQ-ACK 140 bundling to obtain two bundled HARQ-ACK 140 bits. The user equipment (UE) 104 may then determine 510 whether the physical channel structure has normal cyclic prefix (CP) or extended cyclic prefix (CP). For a physical channel structure with extended cyclic prefix (CP), the two bundled HARQ-ACK 140 bits are concatenated 514 with CQI/PMI/RI 141 bits. A joint coding may be applied 516 to the concatenated bits. The user equipment (UE) 104 may then send 518 the joint coded concatenated bits on the physical uplink control channel (PUCCH) using Format 2. For a physical channel structure with normal cyclic prefix (CP), the user equipment (UE) 104 may send 512 the CQI/PMI/RI 141 and the two bundled HARQ-ACK 140 bits on the physical uplink control channel (PUCCH) using Format 2a, where the two bundled HARQ-ACK 140 bits are carried on the $2^{nd}$ reference symbol.

For a Release-10 user equipment (UE) 104 that supports up to four HARQ-ACK 140 bits, up to two cells (or component carriers) may be assigned to the user equipment (UE) 104. Since the new DFT-S-OFDM based physical uplink control channel (PUCCH) format is not supported by such a user equipment (UE) 104, the backward compatible Format 2/2a/2b should be adopted. With spatial bundling on each component carrier, the HARQ-ACK 104 bits can be reduced to two bits, b(0) and b(1). In spatial bundling, two bits on the same cell (or component carrier) may be bundled into one HARQ-ACK 140 bit. The possible combinations for spatial bundling applied on each cell (or component carrier) are listed in Table 2.

TABLE 2

| CQI/ PMI/ RI bits | Total HARQ-ACK bits | First Component Carrier | | Second Component Carrier | | Total HARQ-ACK bits with spatial bundling | Extended CP | Normal CP |
|---|---|---|---|---|---|---|---|---|
| | | HARQ-ACK bits | HARQ-ACK bit with spatial bundling | HARQ-ACK bits | HARQ-ACK bit with spatial bundling | | | |
| 1-11 | 2 | 1 | b(0) | 1 | b(1) | b(0), b(1) | Format 2 with joint coding | Format 2b |
| 1-11 | 3 | 2 | b(0) | 1 | b(1) | b(0), b(1) | | |
| 1-11 | 3 | 1 | b(0) | 2 | b(1) | b(0), b(1) | | |
| 1-11 | 4 | 2 | b(0) | 2 | b(1) | b(0), b(1) | | |

For a Release-10 user equipment (UE) 104 that supports more than four HARQ-ACK 140 bits, but only has up to four HARQ-ACK 140 bits to be reported, a similar concept may be applied. If only two cells (or component carriers) are assigned, the same combinations from Table 2 above may be used. If more than two cells (or component carriers) are allocated, cross-cell or cross-component carrier HARQ-ACK 140 bundling (also referred to as inter-cell or inter-component carrier HARQ-ACK 140 bundling) is applied to reduce the number of HARQ-ACK 140 bits on backward compatible physical uplink control channel (PUCCH) formats.

With partial HARQ-ACK 140 bundling, the number of HARQ-ACK 140 bits for each bundled HARQ-ACK 140 bit should be as close to equal as possible. Furthermore, if two codewords are transmitted on the same component carrier, the codewords tend to experience similar channel quality. Thus, spatial bundling within a component carrier should be applied before cross or inter-component carrier bundling. The order of the bundled bits b(0), b(1) should follow the order of component carriers before bundling. The possible combinations for up to four bits of HARQ-ACK 140 with more than two component carriers are listed in Table 3.

bundling may be first applied to the component carrier that has two bits of HARQ-ACK 140 feedback to obtain one bundled bit b(0). Cross-component carrier or inter-component carrier bundling may be applied to the two component carriers (each with one bit of HARQ-ACK 140 feedback) to obtain a second bundled bit b(1). For example, if CC1 and CC3 each have one bit of HARQ-ACK 140 feedback and CC2 has two bits of HARQ-ACK 140 feedback, spatial bundling on the two bits of CC2 may be applied to obtain one bundled bit b(0). Cross-bundling may be applied to CC1 and CC3 to obtain the second bit b(1). With component carrier ordering, CC1 is in front of CC2. Thus, the reported bundled HARQ-ACK 140 bits may have an order of CC1+CC3, spatial bundling on CC2.

Alternatively, the number of ACKs (0-4) in the HARQ-ACK 140 may be reported using the fourth bundling method discussed below in relation to FIG. 9. In one configuration, spatial bundling may be applied to the component carrier with two bits of HARQ-ACK 140 and the number of ACKs (0-3) in the HARQ-ACK is then reported using the fourth bundling method discussed below in relation to FIG. 9.

TABLE 3

| CQI/ PMI/ RI bits | Total HARQ-ACK bits | CC1 | CC2 | CC3 | CC4 | Total HARQ-ACK bits with bundling $N_{HARQ-ACK\_PUCCH} = 2$ | Extended CP | Normal CP |
|---|---|---|---|---|---|---|---|---|
| 1-11 | 3 | 1 | 1 | 1 | — | b(0) = (CC1 + CC2), b(1) = CC3 | Format 2 with joint coding | Format 2b |
| 1-11 | 4 | 1 | 1 | 2 | — | b(0) = (CC1 + CC2), b(1) = spatial bundling on CC3 | | |
| 1-11 | 4 | 1 | 2 | 1 | — | b(0) = (CC1 + CC3), b(1) = spatial bundling on CC2 | | |
| 1-11 | 4 | 2 | 1 | 1 | — | b(0) = spatial bundling on CC1, b(1) = (CC2 + CC3) | | |
| 1-11 | 4 | 1 | 1 | 1 | 1 | b(0) = (CC1 + CC2), b(1) = (CC3 + CC4) | | |

For three component carriers, each with one bit of HARQ-ACK 140 feedback, cross-component carrier or inter-component carrier bundling may be applied on the first component carrier CC1 and the second component carrier CC2 to obtain one bundled bit b(0). The second bundled bit (b1) may be obtained from the third component carrier CC3. Alternatively, the number of ACKs (0-3) in the HARQ-ACK 140 may be reported using the fourth bundling method discussed below in relation to FIG. 9.

For three component carriers, where one of the component carriers has two bits of HARQ-ACK 140 feedback, spatial For four component carriers, where each component carrier has 1 bit of HARQ-ACK 140 feedback, cross-component carrier or inter-component carrier bundling may be applied to CC1 and CC2 to obtain a first bundled bit b(0). Cross-component carrier bundling may then be applied on CC3 and CC4 to obtain a second bundled bit b(1). Alternatively, the number of ACKs (0-4) may be reported using the bits b(0) and b(1) cyclically as discussed below in relation to FIG. 9.

For a Release-10 user equipment (UE) 104 that supports and reports more than four unbundled HARQ-ACK 140 bits, both spatial HARQ-ACK 140 bundling in a cell (or component carrier) and cross-cell (or component carrier) HARQ-ACK 140 bundling (i.e., inter-cell (or component carrier) HARQ-ACK 140 bundling) may be used to reduce the number of HARQ-ACK 140 bits to two bits. Several bundling methods can be used. A first bundling method is discussed below in relation to FIG. 6. A second bundling method is discussed below in relation to FIG. 7. A third bundling method is discussed below in relation to FIG. 8. A fourth bundling method is discussed below in relation to FIG. 9.

If multiple HARQ-ACK 140 bundling methods are allowed and specified, the selection of the HARQ-ACK 140 bundling method and corresponding physical uplink control channel (PUCCH) formats may be signaled by the eNode B 102 on the physical downlink control channel (PDCCH) or by explicit higher layer signaling. If only one HARQ-ACK 140 bundling method is allowed and specified, the given method may be used without selection. A benefit of using the method 500 of FIG. 5 is that a minimal amount of change to the current specification is required.

Figure 6:
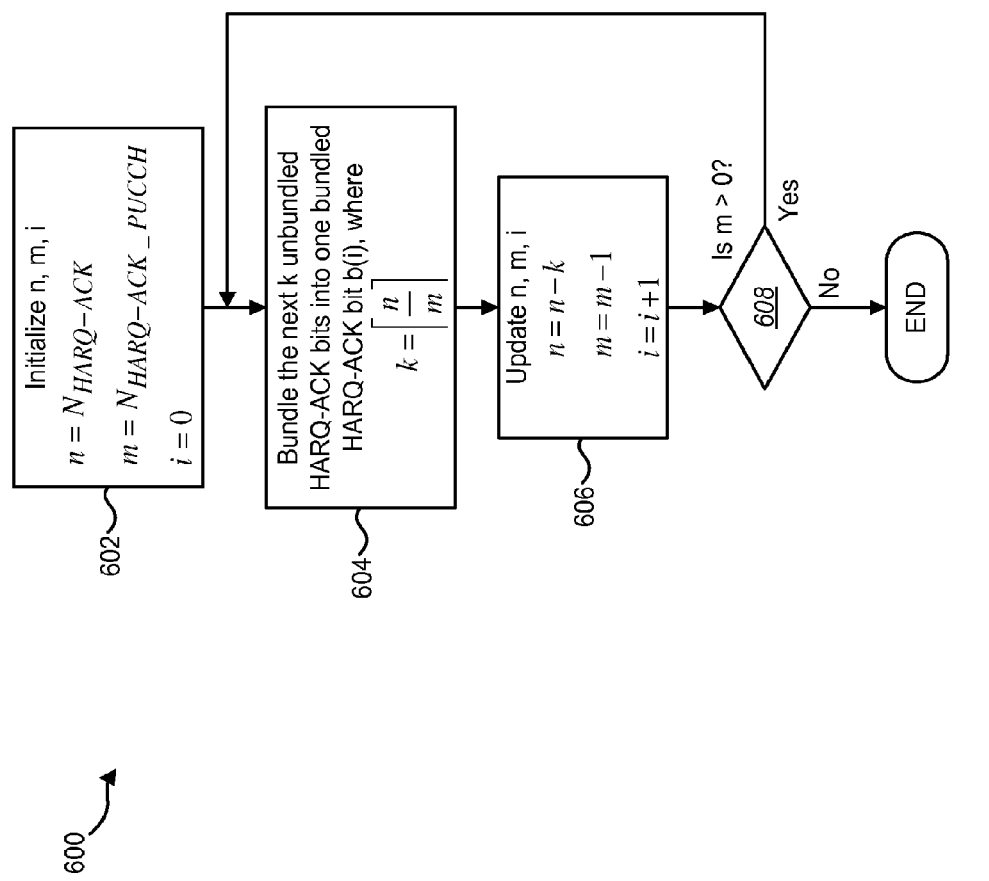
FIG. 6 is a flow diagram illustrating a first bundling method.

FIG. 6 is a flow diagram illustrating a first bundling method 600. The method may be performed by a user equipment (UE) 104. The user equipment (UE) 104 may initialize 602 n, m, and i: n=$N_{HARQ\text{-}ACK}$, m=$N_{HARQ\text{-}ACK\_PUCCH}$ and i=0. n represents the number of HARQ-ACK 140 bits left to be bundled into the m bits available. The user equipment (UE) 104 may bundle 604 the next k unbundled HARQ-ACK 140 bits into one bundled HARQ-ACK 140 bit b(i), where $$k = \lceil \frac{n}{m} \rceil.$$

The user equipment (UE) 140 may then update 606 n, m and i: n=n−k, m=m−1 and i=i+1. The user equipment (UE) 104 may determine 608 whether m>0 (i.e., whether bundled HARQ-ACK 140 bits are still available). If m>0, the user equipment (UE) 104 may bundle 604 the next k unbundled HARQ-ACK 140 bits into a bundled HARQ-ACK 140 bit b(i). If m=0, the method 600 ends.

For example, if a user equipment (UE) 104 is allocated four component carriers and a total of seven bits of HARQ-ACK 140 need to be reported, n=7 and m=2. The first four HARQ-ACK 140 bits may be bundled into one bit b(0) and the last three HARQ-ACK 140 bits may be bundled into another bit b(1).

Figure 7:
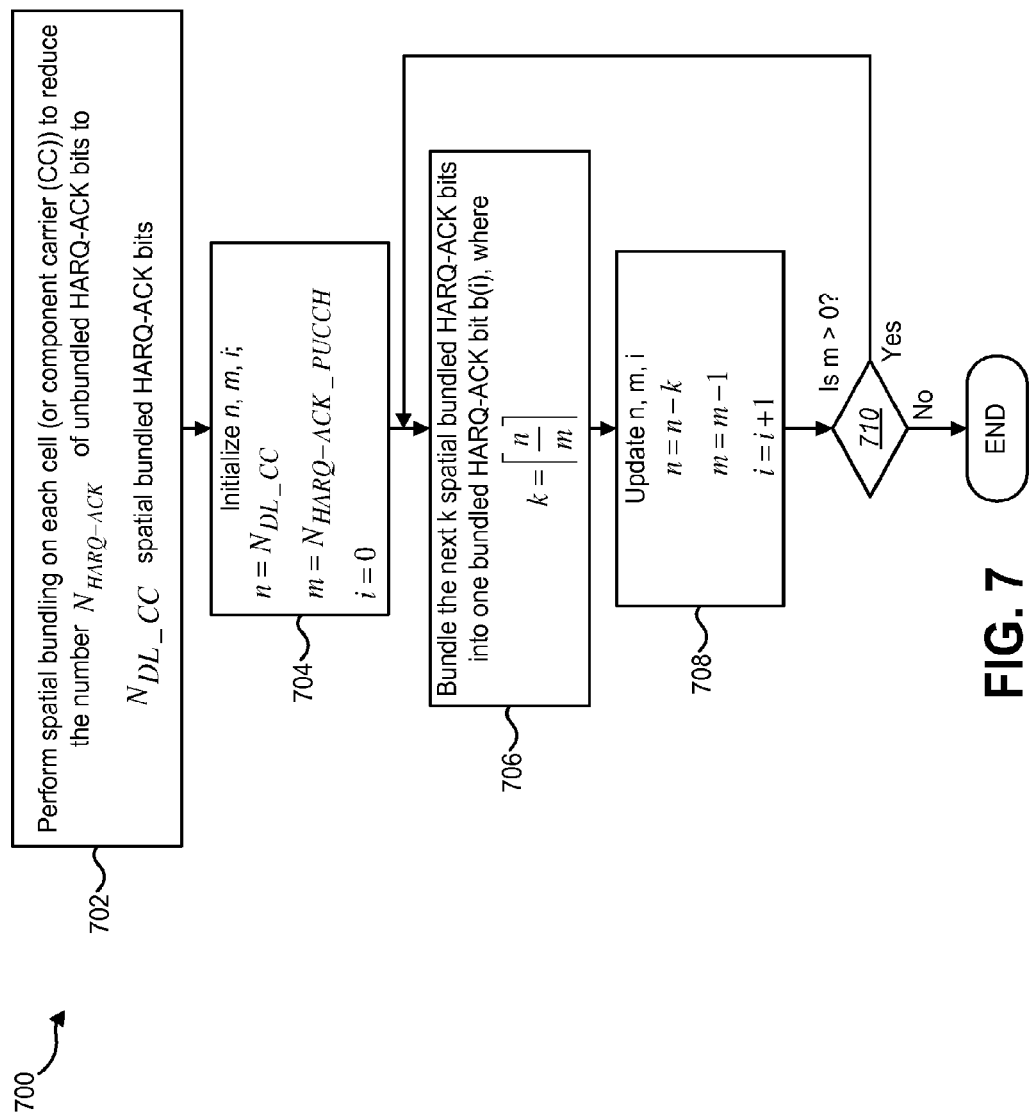
FIG. 7 is a flow diagram illustrating a second bundling method.

FIG. 7 is a flow diagram illustrating a second bundling method 700. The method 700 may be performed by a user equipment (UE) 104. The user equipment (UE) 104 may perform 702 spatial bundling on each cell (or component carrier) to reduce the number $N_{HARQ\text{-}ACK}$ of unbundled HARQ-ACK 140 bits to $N_{L\_CC}$ spatial bundled HARQ-ACK 140 bits. In other words, one spatial bundled HARQ-ACK 140 bit is used for each cell (or component carrier).

The user equipment (UE) 104 may then initialize 704 n, m, and i: n=$N_{DL}$_CC, m=$N_{HARQ\text{-}ACK\_PUCCH}$ and i=0. n represents the number of HARQ-ACK 140 bits left to be bundled into the m bits available. The user equipment (UE) 104 may bundle 706 the next k spatial bundled HARQ-ACK 140 bits into one bundled HARQ-ACK 140 bit b(i), where $$k = \lceil \frac{n}{m} \rceil.$$

The user equipment (UE) 104 may then update 708 n, m and i: n=n−k, m=m−1 and i=i+1. The user equipment (UE) 104 may determine 710 whether m>0 (i.e., whether bundled HARQ-ACK 140 bits are still available). If m>0, the user equipment (UE) 104 may bundle 706 the next k spatial bundled HARQ-ACK 140 bits into one bundled HARQ-ACK 140 bit b(i). If m=0, the method 700 ends.

For example, if a user equipment (UE) 104 is allocated with $N_{DL\_CC}$=4 component carriers and a total of $N_{HARQ\text{-}ACK}$=7 bits of HARQ-ACK 140 that need to be reported, the HARQ-ACK 140 bits are first spatially bundled 702 into $N_{DL\_CC}$=4 spatial bundled HARQ-ACK 140 bits, one bit for each component carrier. Then, the first two spatial bundled HARQ-ACK 140 bits are further bundled 706 into one bundled physical uplink control channel (PUCCH) HARQ-ACK 140 bit b(0). The other two spatial bundled HARQ-ACK 140 bits are bundled 706 into another bundled physical uplink control channel (PUCCH) HARQ-ACK 140 bit b(1).

Figure 8:
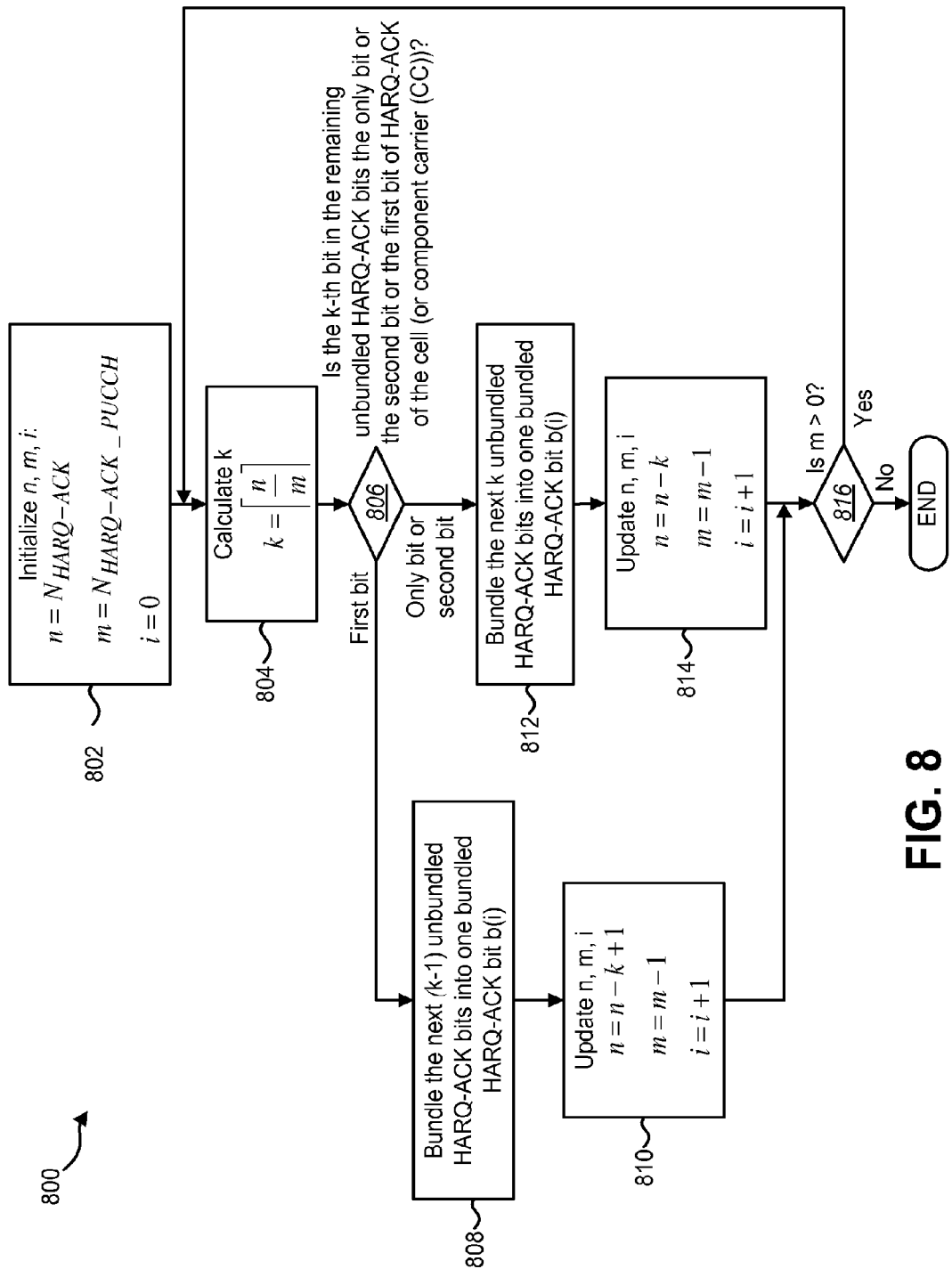
FIG. 8 is a flow diagram illustrating a third bundling method.

FIG. 8 is a flow diagram illustrating a third bundling method 800. The method 800 may be performed by a user equipment (UE) 104. In the third bundling method 800, the user equipment (UE) 104 may try to bundle the same number $N_{HARQ\text{-}ACK}$ of HARQ-ACK 140 bits into $N_{HARQ\text{-}ACK\_PUCCH}$ bits, with avoidance of HARQ-ACK 140 bits splitting on the same cell (or component carrier) (HARQ-ACK 140 bits splitting on the same cell may occur with the first bundling method 600).

The user equipment (UE) 104 may initialize 802 n, m, and i: n=$N_{HARQ\text{-}ACK}$, m=$N_{HARQ\text{-}ACK\_PUCCH}$ and i=0. n represents the number of HARQ-ACK 140 bits left to be bundled into the m bits available. The user equipment (UE) 104 may next calculate 804 k, where $$k = \lceil \frac{n}{m} \rceil.$$

The user equipment (UE) 104 may then determine 806 whether the k-th bit in the remaining unbundled HARQ-ACK 140 bits is the only bit or the second bit or the first bit of the HARQ-ACK 140 of the cell (or component carrier). If the k-th bit in the remaining unbundled bits is the only bit or the second bit, the user equipment (UE) 104 may bundle 812 the next k unbundled HARQ-ACK 140 bits into one bundled HARQ-ACK 140 bit b(i). The user equipment (UE) 104 may then update 814 n, m and i: n=n−k, m=m−1 and i=i+1. The user equipment (UE) 104 may determine 816 whether m>0 (i.e., whether bits for bundled HARQ-ACK 140 are still available).

If the k-th bit in the remaining unbundled HARQ-ACK 140 bits is the first bit, the user equipment (UE) 104 may bundle 808 the next (k−1) unbundled HARQ-ACK 140 bits into one bundled HARQ-ACK 140 bit b(i). This avoids splitting the two bits of HARQ-ACK 140 feedback into two bundled physical uplink control channel (PUCCH) HARQ-ACK 140 bits. The user equipment (UE) 104 may update 810 n, m and i: n=n−k+1, m=m−1 and i=i+1. The user equipment (UE) 104 may then determine 816 whether m>0 (i.e., whether bits for bundled HARQ-ACK 140 are still available).

If m>0, the user equipment (UE) 104 may again calculate 804 k, where $$k = \lceil \frac{n}{m} \rceil.$$

Figure 9:
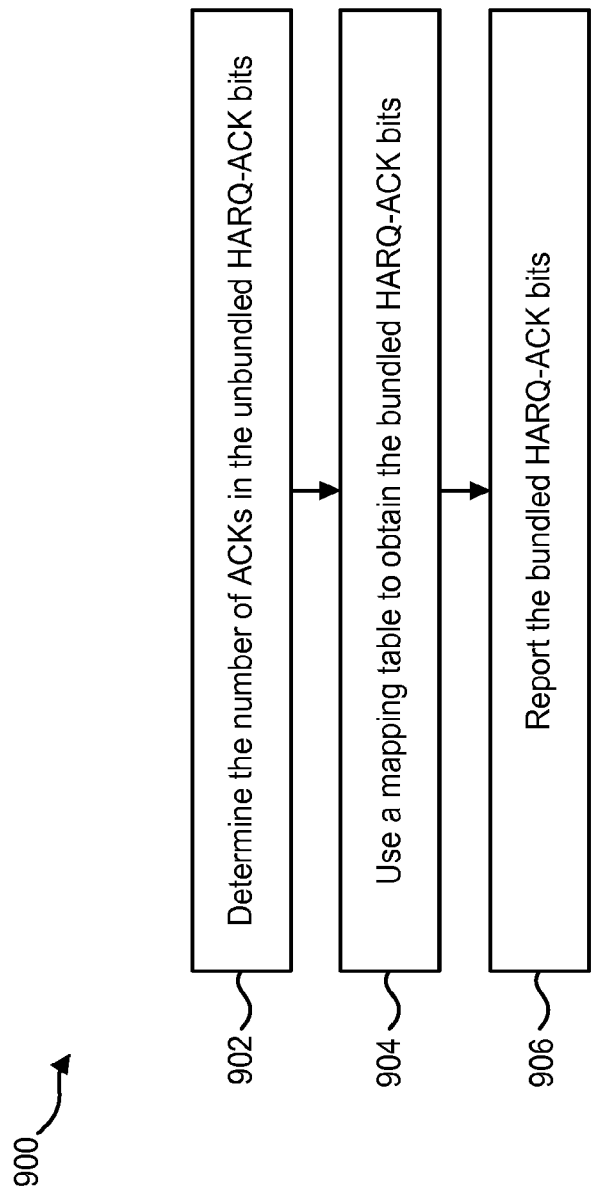
FIG. 9 is a flow diagram of a fourth bundling method.

FIG. 9 is a flow diagram of a fourth bundling method 900. The method 900 may be performed by a user equipment (UE)

104. The user equipment (UE) 104 may determine 902 the number of ACKs in the unbundled HARQ-ACK 140 bits. The user equipment (UE) 104 may then use 904 a mapping table to obtain the bundled HARQ-ACK 140 bits. For example, if there are two bits available for bundled HARQ-ACK 140, the user equipment (UE) 104 may use 904 the mapping table shown below in Table 4. The user equipment (UE) 104 may then report 906 the bundled HARQ-ACK 140 bits. With LTE Release-10, the maximum number of HARQ-ACK 140 bits to be reported on the physical uplink control channel (PUCCH) is ten. A similar method is used in LTE Release-8/9 for time division duplexing (TDD) but not for frequency division duplexing (FDD) and is not applicable for carrier aggregation.

TABLE 4

| Number of ACKs in $N_{HARQ\text{-}ACK}$ HARQ-ACK bits | Bundled HARQ-ACK bits b(0), b(1) |
|---|---|
| 0 | 0, 0 |
| 1 | 1, 1 |
| 2 | 1, 0 |
| 3 | 0, 1 |
| 4 | 1, 1 |
| 5 | 1, 0 |
| 6 | 0, 1 |
| 7 | 1, 1 |
| 8 | 1, 0 |
| 9 | 0, 1 |
| 10 | 1, 1 |

Since the eNode B 102 knows how many downlink codewords are transmitted, the eNode B 102 knows all codewords are received correctly if the received number of ACKs is the same as the number of transmitted codewords. If the received number of ACKs is not the same as the number of transmitted codewords, the eNode B 102 may have to retransmit all the codewords, since the eNode B 102 does not know which codeword was in error.

The bundled bits may not be unique. Thus, the eNode B 102 may make a decision on the most likely case (i.e., the highest entry that is smaller or equal to the number of transmitted downlink codewords). For example, b(0), b(1) with vales of 1, 0 are received by the eNode B 102 for feedbacks with two, five and eight ACKs. If the eNode B 102 sends fewer than five codewords, the eNode B 102 may decide that two ACKs were received with no confusion. If the eNode B 102 sends five to seven codewords, the eNode B 102 may treat the received signal as five ACKs. If the eNode B 102 sends eight or more codewords, the eNode B 102 may treat the received signal as eight ACKs.

As another example, if there are three bundled HARQ-ACK 140 bits, the user equipment (UE) 104 may use the mapping table shown below in Table 5. When $(C_{PUCCH}-N_{CQI}) > N_{HARQ\text{-}ACK\_PUCCH}$ is 3 if the fourth bundling method 900 is used.

TABLE 5

| Number of ACKs in $N_{HARQ\text{-}ACK}$ HARQ-ACK bits | Bundled HARQ-ACK bits b(0), b(1), b(2) |
|---|---|
| 0 | 0, 0, 0 |
| 1 | 1, 1, 1 |
| 2 | 1, 1, 0 |
| 3 | 1, 0, 1 |
| 4 | 1, 0, 0 |
| 5 | 0, 1, 1 |
| 6 | 0, 1, 0 |
| 7 | 0, 0, 1 |

TABLE 5-continued

| Number of ACKs in $N_{HARQ\text{-}ACK}$ HARQ-ACK bits | Bundled HARQ-ACK bits b(0), b(1), b(2) |
|---|---|
| 8 | 1, 1, 1 |
| 9 | 1, 1, 0 |
| 10 | 1, 0, 1 |

The fourth bundling method 900 may be applied with spatial HARQ-ACK 140 bundling on each component carrier. Thus, $N_{HARQ\text{-}ACK}$ unbundled bits may be reduced to $N_{DL\_CC}$ spatial bundled HARQ-ACK 140 bits. Therefore, only the entry from 0 to $N_{DL\_CC}$ may be required. With LTE Release-10, the maximum number of cells (or component carriers) is five.

The fourth bundling method 900 is most suitable for dynamic scheduling, where the cells (or component carriers) are configured as scheduled but do not always have data transmission. For example, if a user equipment (UE) 104 is configured with four cells (or component carriers) but only one component carrier has data transmission, the first bundling method 600, second bundling method 700 and third bundling method 800 may each give a NACK feedback in all cases. The fourth bundling method 900 may still successfully report if the codewords are received correctly.

Figure 10:
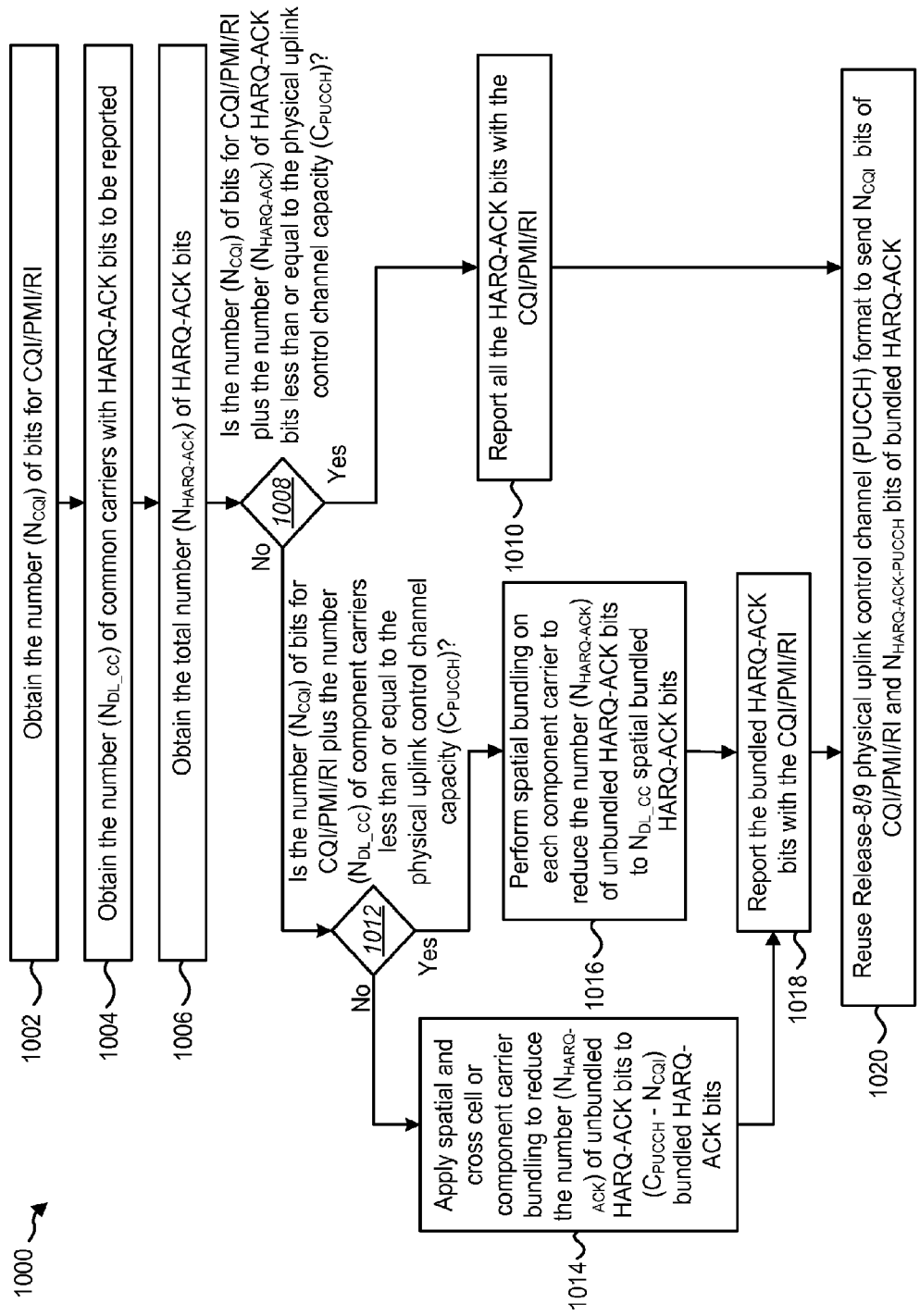
FIG. 10 is a flow diagram of another method for simultaneous CQI/PMI/RI and HARQ-ACK reporting with backward compatible physical uplink control channel (PUCCH) formats.

FIG. 10 is a flow diagram of another method 1000 for simultaneous CQI/PMI/RI 141 and HARQ-ACK 140 reporting with backward compatible physical uplink control channel (PUCCH) formats. The method 1000 may be one configuration for using 416 a backward compatible physical uplink control channel (PUCCH) format to simultaneously carry the CQI/PMI/RI 141 and the HARQ-ACK 140 discussed above in relation to FIG. 4. In the method 1000 of FIG. 10, the CQI/PMI/RI 141 is jointly coded with either a full HARQ-ACK 140 or a flexible partial HARQ-ACK 140 bundling, depending on the CQI/PMI/RI 141 and HARQ-ACK 140 payload size.

The method 1000 may be performed by a user equipment (UE) 104. The user equipment (UE) 104 may obtain 1002 the number $N_{CQI}$ of bits for the CQI/PMI/RI 141. The user equipment (UE) 104 may also obtain 1004 the number $N_{DL\_CC}$ of downlink component carriers with HARQ-ACK 141 bits to be reported. The user equipment (UE) 104 may further obtain 1006 a total number $N_{HARQ\text{-}ACK}$ of HARQ-ACK 140 bits.

The user equipment (UE) 104 may determine 1008 whether the number $N_{CQI}$ of bits for the CQI/PMI/RI 141 plus the number $N_{HARQ\text{-}ACK}$ of HARQ-ACK 140 bits is less than or equal to the physical uplink control channel (PUCCH) capacity ($C_{PUCCH}$). The physical uplink control channel (PUCCH) capacity ($C_{PUCCH}$) is the maximum number of information bits that can be transmitted on a physical uplink control channel (PUCCH) format. Thus, $C_{PUCCH}=13$ bits for extended cyclic prefix (CP) and $C_{PUCCH}=15$ bits for normal cyclic prefix (CP).

One physical uplink control channel (PUCCH) CQI/PMI/RI (20, 0) coding method supports up to thirteen bits payload (i.e., it allows joint coding of up to eleven bits CQI/PMI/RI 141 concatenated with two bits of HARQ-ACK 140). With normal cyclic prefix (CP), one or two extra bits can be carried on the $2^{nd}$ reference signal, as in physical uplink control channel (PUCCH) Format 2a/2b.

In LTE Release-10 and beyond with carrier aggregation, both the number $N_{HARQ\text{-}ACK}$ of HARQ-ACK 140 bits and number $N_{DL\_CC}$ of downlink component carriers are greater than or equal to two. Also, the number $N_{HARQ\text{-}ACK}$ of HARQ-ACK 140 bits is greater than or equal to the number $N_{DL\_CC}$ of downlink component carriers. In the method 1000 of FIG. 10, as many physical uplink control channel (PUCCH) HARQ-ACK 140 bits are carried as possible (i.e., the maximum allowed value of the total number $N_{HARQ-ACK}$ of HARQ-ACK 140 bits).

If the number $N_{CQI}$ of bits for the CQI/PMI/RI 141 plus the number $N_{HARQ-ACK}$ of HARQ-ACK 140 bits is less than or equal to the physical uplink control channel (PUCCH) capacity ($C_{PUCCH}$), the user equipment (UE) 104 may report 1010 all the HARQ-ACK 140 bits with the CQI/PMI/RI 141 (i.e., device the bits to be reported). Thus, $N_{HARQ-ACK\_PUCCH} = N_{HARQ-ACK}$. The user equipment (UE) 104 may then reuse 1020 the Release-8/9 physical uplink control channel (PUCCH) format to send $N_{CQI}$ bits of CQI/PMI/RI 141 and $N_{HARQ-ACK\_PUCCH}$ bits of bundled HARQ-ACK 140.

If the number $N_{CQI}$ of bits for the CQI/PMI/RI 141 plus the number $N_{HARQ-ACK}$ of HARQ-ACK 140 bits is not less than or equal to the physical uplink control channel (PUCCH) capacity ($C_{PUCCH}$), the user equipment (UE) 104 may determine 1012 whether the number $N_{CQI}$ of bits for the CQI/PMI/RI 141 plus the number $N_{DL\_CC}$ of downlink component carriers is less than or equal to the physical uplink control channel (PUCCH) capacity ($C_{PUCCH}$).

If the number $N_{CQI}$ of bits for the CQI/PMI/RI 141 plus the number $N_{DL\_CC}$ of downlink component carriers is less than or equal to the physical uplink control channel (PUCCH) capacity ($C_{PUCCH}$), the user equipment (UE) 104 may perform 1016 spatial HARQ-ACK 140 bundling on each cell (or component carrier) to reduce the number $N_{HARQ-ACK}$ of unbundled HARQ-ACK 140 bits to $N_{DL\_CC}$ spatial bundled HARQ-ACK 140 bits. The user equipment (UE) 104 may report 1018 the $N_{DL\_CC}$ spatial bundled HARQ-ACK 140 bits with the $N_{CQI}$ bits of CQI/PMI/RI 141 (i.e., decide the bits to be reported). Thus, $N_{HARQ-ACK\_PUCCH} = N_{DL\_CC}$. The user equipment (UE) 104 may then reuse 1020 the Release-8/9 physical uplink control channel (PUCCH) format to send $N_{CQI}$ of bits of CQI/PMI/RI 141 and $N_{HARQ-ACK\_PUCCH}$ bits of bundled HARQ-ACK 140. Reusing 1020 the Release-8/9 physical uplink control channel (PUCCH) format refers to determining how to format the bits for transmission.

If the number $N_{CQI}$ of bits for the CQI/PMI/RI 141 plus the number $N_{DL\_CC}$ of downlink component carriers is not less than or equal to the physical uplink control channel (PUCCH) capacity ($C_{PUCCH}$), the user equipment (UE) 104 may apply 1014 spatial bundling and cross or inter-cell (or component carrier) bundling to reduce the number $N_{HARQ-ACK}$ of unbundled HARQ-ACK 140 bits to $C_{PUCCH} - N_{CQI}$ bundled HARQ-ACK 140 bits. The user equipment (UE) 104 may report 1018 the $C_{PUCCH} - N_{CQI}$ bundled HARQ-ACK 140 bits with the $N_{CQI}$ bits of CQI/PMI/RI 141 (i.e., decide the bits to be reported). Thus, $N_{HARQ-ACK\_PUCCH} = (C_{PUCCH} - N_{CQI})$. The user equipment (UE) 104 may then reuse 1020 the Release-8/9 physical uplink control channel (PUCCH) format to send $N_{CQI}$ of bits of CQI/PMI/RI 141 and $N_{HARQ-ACK\_PUCCH}$ bits of bundled HARQ-ACK 140.

If the number $N_{HARQ-ACK\_PUCCH}$ of bundled HARQ-ACK 140 bits is equal to two, the method 1000 of FIG. 10 becomes the same as the method 500 of FIG. 5 with partial bundling up to two bits. If the number $N_{HARQ-ACK\_PUCCH}$ of bundled HARQ-ACK 140 bits is greater than two, the same bundling methods discussed above (i.e., the first bundling method 600, second bundling method 700, third bundling method 800 and fourth bundling method 900) may be used.

With extended cyclic prefix (CP), $C_{PUCCH}$ is thirteen. After the $N_{HARQ-ACK\_PUCCH}$ bits of bundled physical uplink control channel (PUCCH) HARQ-ACK 140 bits are generated, Format 2 may be used by concatenating and joint coding $N_{HARQ-ACK\_PUCCH}$ bits of HARQ-ACK 140 with $N_{CQI}$ bits of CQI/PMI/RI 141. With normal cyclic prefix (CP), there are several options. In a first option, Format 2b is always used.

In the first option, $C_{PUCCH}$ is fifteen. The last two of the $N_{HARQ-ACK\_PUCCH}$ bits of bundled physical uplink control channel (PUCCH) HARQ-ACK 140 bits may be carried on the $2^{nd}$ reference signal. The other $N_{HARQ-ACK\_PUCCH} - 2$ bundled physical uplink control channel (PUCCH) HARQ-ACK 140 bits may be concatenated and joint coded with the CQI/PMI/RI 141 on the physical uplink control channel (PUCCH) resource.

In this first option, the last two bits of bundled HARQ-ACK 140 are always transmitted on the reference symbol. Depending on the CQI/PMI/RI 141 payload size, the bundled HARQ-ACK 140 bits that are joint coded with the CQI/PMI/RI 141 may experience different performance. Furthermore, by using the $2^{nd}$ reference symbols to carry bundled HARQ-ACK 140 bits, the performance of joint coding may be degraded because only one reference symbol is used for channel estimation.

In a second option, $C_{PUCCH}$ is thirteen instead of fifteen. The user equipment (UE) 104 may use Format 2 by concatenating and joint coding $N_{HARQ-ACK\_PUCCH}$ bits of HARQ-ACK 140 with $N_{CQI}$ bits of CQI/PMI/RI 141. Thus, the same format may be used for normal cyclic prefix (CP) as in extended cyclic prefix (CP). A third option is discussed below in relation to FIG. 11.

Figure 11:
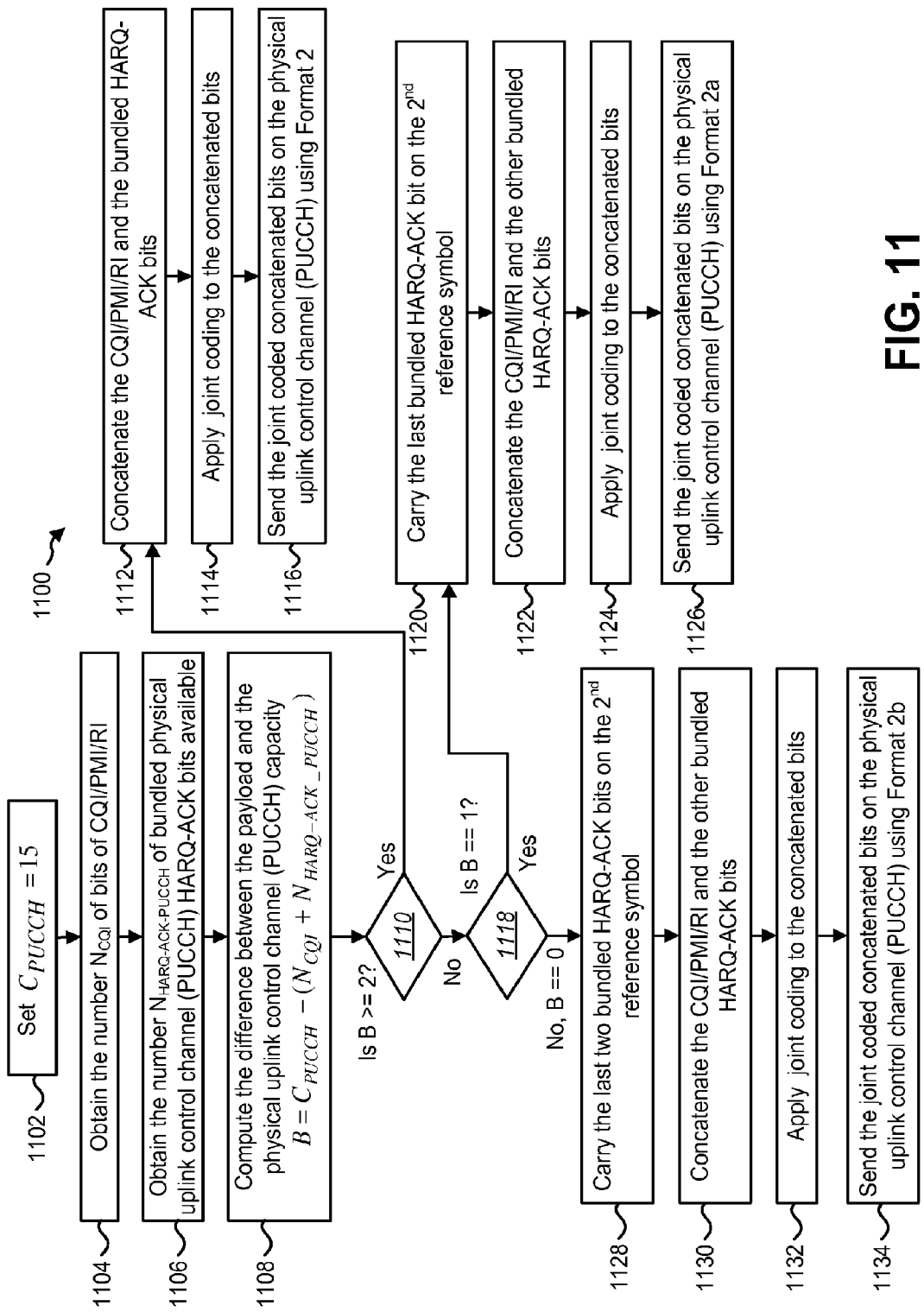
FIG. 11 is a flow diagram of a method for determining the physical uplink control channel (PUCCH) format for normal cyclic prefix (CP)

FIG. 11 is a flow diagram of a method 1100 for determining the physical uplink control channel (PUCCH) format for normal cyclic prefix (CP). The method 1100 may be performed by a user equipment (UE) 104. The user equipment (UE) 104 may set 1102 the $C_{PUCCH}$ to 15. The user equipment (UE) 104 may obtain 1104 the number $N_{CQI}$ of bits for the CQI/PMI/RI 141. The user equipment (UE) 104 may also obtain 1106 the number $N_{HARQ-ACK\_PUCCH}$ of bundled physical uplink control channel (PUCCH) HARQ-ACK 140 bits.

The user equipment (UE) 104 may compute 1108 the difference between the payload and the physical uplink control channel (PUCCH) capacity as $B = C_{PUCCH} - (N_{CQI} + N_{HARQ-ACK\_PUCCH})$. The user equipment (UE) 104 may then determine 1110 if the difference between the payload and the physical uplink control channel (PUCCH) capacity $B \geq 2$. If the difference between the payload and the physical uplink control channel (PUCCH) capacity $B \geq 2$, the user equipment (UE) 104 may concatenate 1112 the CQI/PMI/RI 141 and the bundled HARQ-ACK 140 bits. The user equipment (UE) 104 may apply 1114 joint coding to the concatenated bits. The user equipment (UE) 104 may then send 1116 the joint coded concatenated bits on the physical uplink control channel (PUCCH) using Format 2.

If the difference between the payload and the physical uplink control channel (PUCCH) capacity B is not $\geq 2$, the user equipment (UE) 104 may determine 1118 whether the difference between the payload and the physical uplink control channel (PUCCH) capacity $B == 1$. If the difference between the payload and the physical uplink control channel (PUCCH) capacity $B == 1$, the user equipment (UE) 104 may carry 1120 the last bundled HARQ-ACK bit on the $2^{nd}$ reference symbol. The user equipment (UE) 104 may concatenate 1122 the CQI/PMI/RI 141 and the other bundled HARQ-ACK 140 bits. The user equipment (UE) 104 may apply 1124 joint coding to the concatenated bits. The user equipment (UE) 104 may then send 1126 the joint coded concatenated bits on the physical uplink control channel (PUCCH) using Format 2a.

If the difference between the payload and the physical uplink control channel (PUCCH) capacity B is not equal to 1, then the difference between the payload and the physical uplink control channel (PUCCH) capacity B=0. The user equipment (UE) 104 may carry 1128 the last two bundled HARQ-ACK 141 bits on the $2^{nd}$ reference symbol. The user equipment (UE) 104 may concatenate 1130 the CQI/PMI/RI 141 and the other bundled HARQ-ACK 140 bits. The user equipment (UE) 104 may apply 1132 joint coding to the concatenated bits. The user equipment (UE) 104 may then send 1134 the joint coded concatenated bits on the physical uplink control channel (PUCCH) using Format 2b.

In the first method 500 (i.e., the method discussed above in relation to FIG. 5), $N_{HARQ\text{-}ACK}$ of HARQ-ACK 140 bits are bundled to obtain $N_{HARQ\text{-}ACK\_PUCCH}$=one or two bundled physical uplink control channel (PUCCH) HARQ-ACK 140 bits to fit into existing Release-8/9 physical uplink control channel (PUCCH) formats. Therefore, the first method 500 requires a minimum of one change to the current specification. However, the first method 500 uses aggressive HARQ-ACK 140 bundling that introduces more overhead or unnecessary retransmissions. Furthermore, the physical uplink control channel (PUCCH) capacity may be wasted when the CQI/PMI/RI 141 payload is smaller and/or the channel condition is good.

The CQI/PMI/RI 141 payload size of a component carrier is decided by the physical uplink control channel (PUCCH) report type and reporting mode as defined below in Table 6. Table 6 is Table 7.2.2-3 from 3GPP TS 36.213. The physical uplink control channel (PUCCH) payload for periodic CQI/PMI/RI 141 may range from a maximum of eleven bits to one or two bits for RI reporting only.

Figure 12:
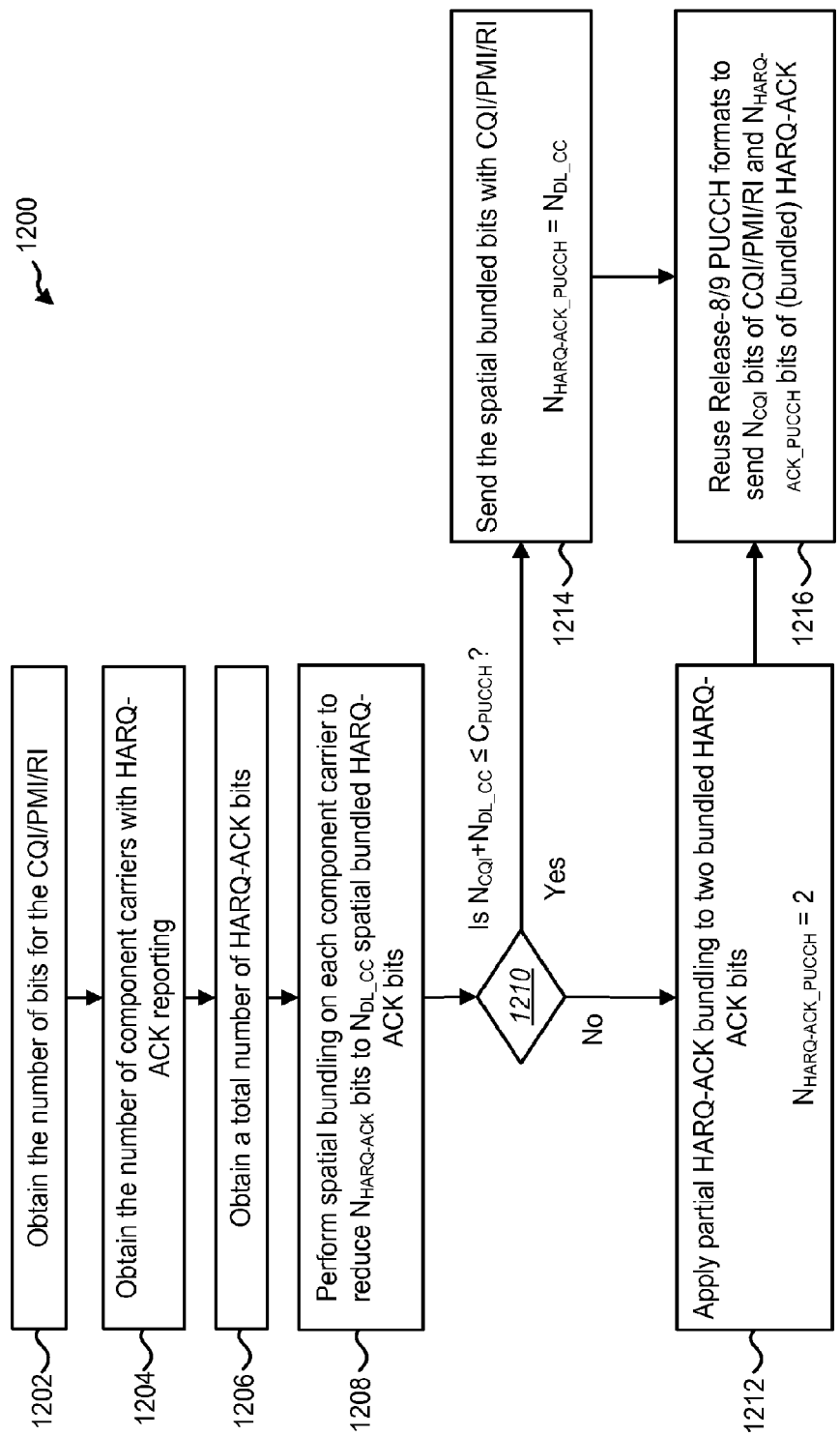
FIG. 12 is a flow diagram illustrating yet another method for simultaneous CQI/PMI/RI and HARQ-ACK reporting with backward compatible physical uplink control channel (PUCCH) formats.

140 reporting with backward compatible physical uplink control channel (PUCCH) formats. The method 1200 of FIG. 12 is a variation of the method 1000 of FIG. 10 with some simplifications. The method 1200 may be performed by a user equipment (UE) 104. Since spatial HARQ-ACK 140 bundling is supported in carrier aggregation, spatial bundling may also be applied first to reduce the number $N_{HARQ\text{-}ACK}$ of unbundled HARQ-ACK 140 bits to $N_{DL\_CC}$ bits of spatial bundled HARQ-ACK 140 bits. Thus, the comparison of $(N_{CQI}+N_{HARQ\text{-}ACK})$ and $C_{PUCCH}$ can be skipped.

The user equipment (UE) 104 may first obtain 1202 the number $N_{CQI}$ of bits for the CQI/PMI/RI 141. The user equipment (UE) 104 may also obtain 1204 the number $N_{DL\_CC}$ of downlink component carriers with HARQ-ACK 140 bits to be reported. The user equipment (UE) 104 may further obtain 1206 a total number $N_{HARQ\text{-}ACK}$ of HARQ-ACK 140 bits.

The user equipment (UE) 104 may then perform 1208 spatial bundling on each component carrier to reduce the number $N_{HARQ\text{-}ACK}$ of HARQ-ACK 140 bits to $N_{DL\_CC}$ spatial bundled HARQ-ACK 140 bits. The user equipment (UE) 104 may compare 1210 the number $N_{DL\_CC}$ of spatial bundled HARQ-ACK 140 bits plus the number $N_{CQI}$ of bits for the CQI/PMI/RI 141 with the physical uplink control channel (PUCCH) capacity $C_{PUCCH}$.

If the number $N_{DL\_CC}$ of spatial bundled HARQ-ACK 140 bits plus the number $N_{CQI}$ of bits for the CQI/PMI/RI 141 is less than or equal to the physical uplink control channel (PUCCH) capacity $C_{PUCCH}$, the user equipment (UE) 104 may send 1214 the spatial bundled bits with the $N_{CQI}$ bits of CQI/PMI/RI 141. Thus, $N_{HARQ\text{-}ACK\_PUCCH}=N_{DL\_CC}$. The

TABLE 6

| PUCCH Report Type | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
| | | RI > 1 | NA | 7 + L | NA | 4 + L |
| 2 | Wideband CQI/PMI | 2 TX Antennas RI = 1 | 6 | 6 | NA | NA |
| | | 4 TX Antennas RI = 1 | 8 | 8 | NA | NA |
| | | 2 TX Antennas RI > 1 | 8 | 8 | NA | NA |
| | | 4 TX Antennas RI > 1 | 11 | 11 | NA | NA |
| 3 | RI | 2-layer spatial multiplexing | 1 | 1 | 1 | 1 |
| | | 4-layer spatial multiplexing | 2 | 2 | 2 | 2 |
| 4 | Wideband CQI | RI = 1 or RI > 1 | NA | NA | 4 | 4 |

For the non-power limited case where the channel quality is good, it may be better to report as many HARQ-ACK 140 bits as possible together with the CQI/PMI/RI 141 to minimize the unnecessary downlink retransmission. Therefore, depending the CQI/PMI/RI 141 and HARQ-ACK 140 payload sizes and the physical uplink control channel (PUCCH) formats, a flexible joint coding method may be applied to carry the maximum allowed HARQ-ACK 140 information. As a tradeoff, more effort is required to specify the second method 1000 (i.e., the method 1000 discussed in relation to FIG. 10) under various situations. Thus, the second method 1000 is more complicated than the first method 500 (i.e., the method 500 discussed above in relation to FIG. 5) and more specification work is needed with the second method 1000. However, one benefit of using the second method 1000 is that the number of unnecessary downlink retransmissions is minimized.

FIG. 12 is a flow diagram illustrating yet another method 1200 for simultaneous CQI/PMI/RI 141 and HARQ-ACK user equipment (UE) 104 may then reuse 1216 the Release-8/9 physical uplink control channel (PUCCH) formats to send the $N_{CQI}$ bits of CQI/PMI/RI 141 and the $N_{HARQ\text{-}ACK\_PUCCH}$ bits of bundled HARQ-ACK 140.

If the number $N_{DL\_CC}$ of bundled HARQ-ACK 140 bits plus the number $N_{CQI}$ of bits for the CQI/PMI/RI 141 is greater than the physical uplink control channel (PUCCH) capacity $C_{PUCCH}$, the user equipment (UE) 104 may apply 1212 partial (or full) HARQ-ACK 140 bundling to two (or one) bundled HARQ-ACK 140 bits. This is because the payload is so high that aggressive bundling is required anyway. Thus, $N_{HARQ\text{-}ACK\_PUCCH}=2$ for partial bundling and $N_{HARQ\text{-}ACK\_PUCCH}=1$ for full bundling. The user equipment (UE) 104 may then reuse 1216 the Release-8/9 physical uplink control channel (PUCCH) formats to send the $N_{CQI}$ bits of CQI/PMI/RI 141 and the $N_{HARQ\text{-}ACK\_PUCCH}$ bits of bundled HARQ-ACK 140. These variations may be applied independently or jointly.

Unless otherwise noted, the use of '/' above represents the phrase "and/or".

Figure 13:
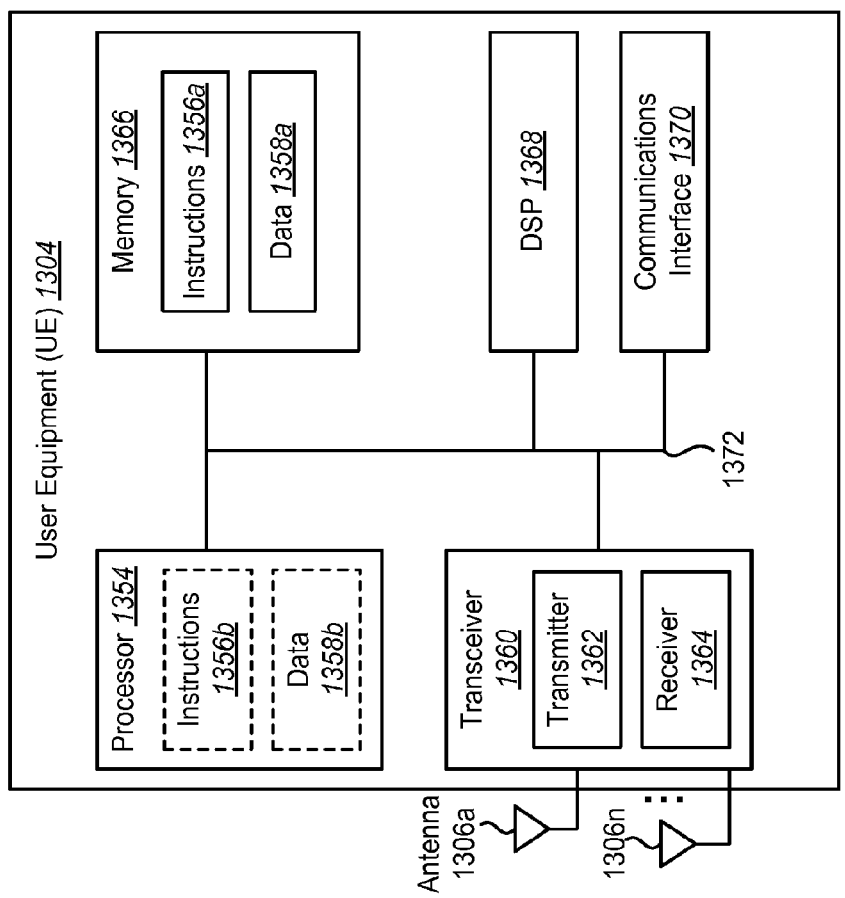
FIG. 13 illustrates various components that may be utilized in a user equipment (UE)

FIG. 13 illustrates various components that may be utilized in a user equipment (UE) 1304. The user equipment (UE) 1304 may be utilized as the user equipment (UE) 104 illustrated previously. The user equipment (UE) 1304 includes a processor 1354 that controls operation of the UE 1304. The processor 1354 may also be referred to as a CPU. Memory 1366, which may include both read-only memory (ROM), random access memory (RAM) or any type of device that may store information, provides instructions 1356a and data 1358a to the processor 1354. A portion of the memory 1366 may also include non-volatile random access memory (NVRAM). Instructions 1356b and data 1358b may also reside in the processor 1354. Instructions 1356b and/or data 1358b loaded into the processor 1354 may also include instructions 1356a and/or data 1358a from memory 1366 that were loaded for execution or processing by the processor 1354. The instructions 1356b may be executed by the processor 1354 to implement the systems and methods disclosed herein.

The user equipment (UE) 1304 may also include a housing that contains a transmitter 1362 and a receiver 1364 to allow transmission and reception of data. The transmitter 1362 and receiver 1364 may be combined into a transceiver 1360. One or more antennas 1306a-n are attached to the housing and electrically coupled to the transceiver 1360.

The various components of the user equipment (UE) 1304 are coupled together by a bus system 1372 which may include a power bus, a control signal bus, and a status signal bus, in addition to a data bus. However, for the sake of clarity, the various buses are illustrated in FIG. 13 as the bus system 1372. The user equipment (UE) 1304 may also include a digital signal processor (DSP) 1368 for use in processing signals. The user equipment (UE) 1304 may also include a communications interface 1370 that provides user access to the functions of the user equipment (UE) 1304. The user equipment (UE) 1304 illustrated in FIG. 13 is a functional block diagram rather than a listing of specific components.

Figure 14:
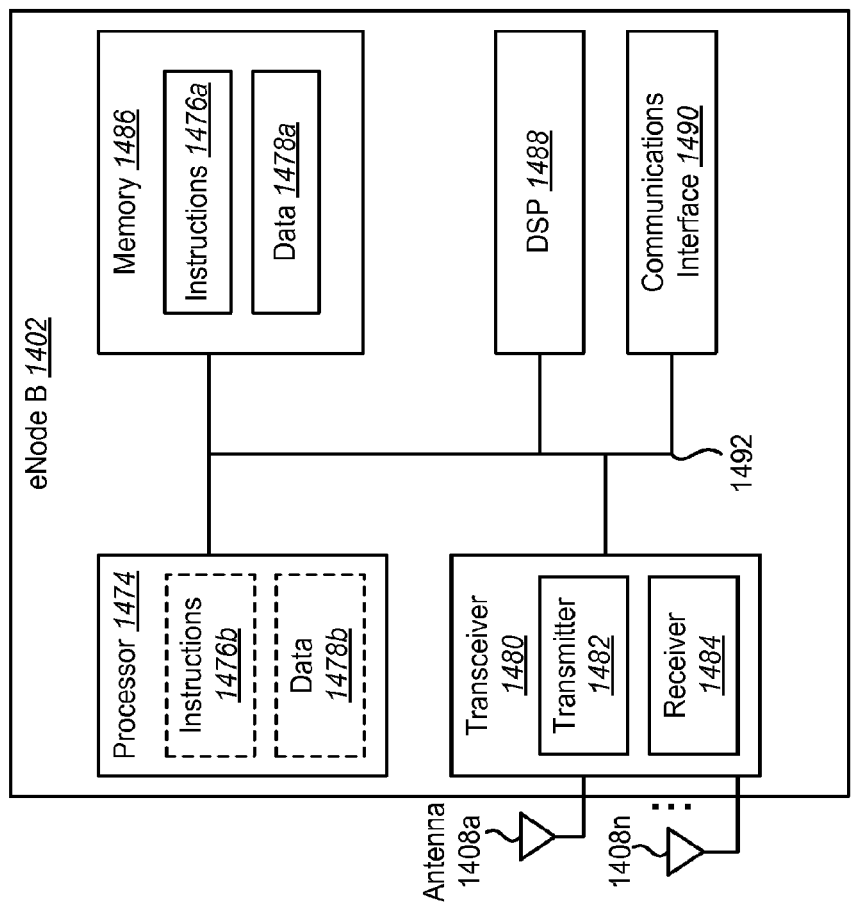
FIG. 14 illustrates various components that may be utilized in an eNode B.

FIG. 14 illustrates various components that may be utilized in an eNode B 1402. The eNode B 1402 may be utilized as the eNode B 102 illustrated previously. The eNode B 1402 may include components that are similar to the components discussed above in relation to the user equipment (UE) 1304, including a processor 1474, memory 1486 that provides instructions 1476a and data 1478a to the processor 1474, instructions 1476b and data 1478b that may reside in or be loaded into the processor 1474, a housing that contains a transmitter 1482 and a receiver 1484 (which may be combined into a transceiver 1480), one or more antennas 1408a-n electrically coupled to the transceiver 1480, a bus system 1492, a DSP 1488 for use in processing signals, a communications interface 1490 and so forth.

Unless otherwise noted, the use of '/' above represents the phrase "and/or".

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio, and microwave, then the coaxial cable, fiber optic cable, twisted pair, DSL, or wireless technologies such as infrared, radio and microwave are included in the definition of transmission medium.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method of operating a user equipment, comprising:
obtaining a number of channel state information bits (CSI bits) for a channel state information (CSI);
obtaining a number of hybrid automatic repeat request acknowledgement bits (HARQ-ACK bits) for hybrid automatic repeat request acknowledgement (HARQ-ACK);
determining whether spatial bundling for the HARQ-ACK bits is applied based on at least the number of CSI bits and the number of HARQ-ACK bits;
in a case that the spatial bundling for the HARQ-ACK bits is applied, performing spatial bundling for the HARQ-ACK bits and transmitting the CSI and the spatial bundled HARQ-ACK on a physical uplink control channel (PUCCH); and
in a case that the spatial bundling for the HARQ-ACK bits is not applied, transmitting the CSI and the HARQ-ACK which is not spatial bundled on the PUCCH.

2. A user equipment, comprising:
an operations circuit configured to and/or programmed to:
obtain a number of channel state information bits (CSI bits) for a channel state information (CSI);
obtain a number of hybrid automatic repeat request acknowledgement bits (HARQ-ACK bits) for hybrid automatic repeat request acknowledgement (HARQ-ACK); and
determine whether spatial bundling for the HARQ-ACK bits is applied based on at least the number of the CSI bits and the number of HARQ-ACK bits; and
a transmitting circuit configured to and/or programmed to:
in a case that the spatial bundling for the HARQ-ACK bits is applied, perform spatial bundling for the HARQ-ACK bits and transmit the CSI and the spatial bundled HARQ-ACK on a physical uplink control channel (PUCCH); and
in a case that the spatial bundling for the HARQ-ACK bits is not applied, transmit the CSI and the HARQ-ACK which is not spatial bundled on the PUCCH.

3. A method of operating a base station, comprising:
obtaining a number of channel state information bits (CSI bits) for a channel state information (CSI);
obtaining a number of hybrid automatic repeat request acknowledgement bits (HARQ-ACK bits) for hybrid automatic repeat request acknowledgement (HARQ-ACK);
determining whether spatial bundling for the HARQ-ACK bits is applied based on at least the number of CSI bits and the number of HARQ-ACK bits;
in a case that the spatial bundling for the HARQ-ACK bits is applied, receiving the CSI and the spatial bundled HARQ-ACK on a physical uplink control channel (PUCCH);
in a case that the spatial bundling for the HARQ-ACK bits is not applied, receiving the CSI and the HARQ-ACK which is not spatial bundled on the PUCCH.

4. A base station, comprising:
an operations circuit configured to and/or programmed to:
obtain a number of channel state information bits (CSI bits) for a channel state information (CSI);
obtain a number of hybrid automatic repeat request acknowledgement bits (HARQ-ACK bits) for hybrid automatic repeat request acknowledgement (HARQ-ACK); and
determine whether spatial bundling for the HARQ-ACK bits is applied based on at least the number of CSI bits and the number of HARQ-ACK bits; and
a receiving circuit configured to and/or programmed to:
in a case that the spatial bundling for the HARQ-ACK bits is applied, receive the CSI and the spatial bundled HARQ-ACK on a physical uplink control channel (PUCCH); and
in a case that the spatial bundling for the HARQ-ACK bits is not applied, receive the CSI and the HARQ-ACK which is not spatial bundled on the PUCCH.

* * * * *